(12) United States Patent
Ikezawa et al.

(10) Patent No.: US 7,594,070 B2
(45) Date of Patent: Sep. 22, 2009

(54) MANAGEMENT OF ACCESS TO STORAGE AREA OF STORAGE SYSTEM

(75) Inventors: Mitsuru Ikezawa, Sagamihara (JP); Ikuko Kobayashi, Kawasaki (JP); Shinji Kimura, Sagamihara (JP); Akihisa Nagami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 424 days.

(21) Appl. No.: 11/625,922

(22) Filed: Jan. 23, 2007

(65) Prior Publication Data

US 2008/0115015 A1 May 15, 2008

(30) Foreign Application Priority Data

Nov. 15, 2006 (JP) ............................. 2006-308917

(51) Int. Cl.
*G06F 12/00* (2006.01)
(52) U.S. Cl. ...................................................... 711/112
(58) Field of Classification Search ........................ None
See application file for complete search history.

(56) References Cited

FOREIGN PATENT DOCUMENTS

| JP | 2004-038934 | 2/2004 |
|---|---|---|
| JP | 2005-122611 | 5/2005 |

*Primary Examiner*—Brian R Peugh
(74) *Attorney, Agent, or Firm*—Antonelli, Terry, Stout & Kraus, LLP.

(57) ABSTRACT

A storage management system for managing, in a computer system, access to a storage area for storing data, the computer system includes: a storage system that provides the storage area; a host computer system that mounts the storage area of the storage system via a network; and a maintenance system that performs maintenance for the storage area of the storage system, the storage management system includes: a mounting decision module that decides, according to a preestablished maintenance schedule, whether the host computer system is currently mounting the storage area of the storage system; a maintenance instruction module that instructs the maintenance system to execute the scheduled maintenance when the mounting decision module decides that the host computer system is not currently mounting the storage area; a host-on detecting module that detects a boot of the host computer system; a maintenance decision module that decides whether the maintenance system is currently performing the maintenance for the storage area when the host-on detecting module detects the boot of the host computer system; and a mounting enabling module that enables the host computer system to mount the storage area of the storage system when the maintenance decision module decides that the maintenance system is not currently performing the maintenance for the storage area.

20 Claims, 22 Drawing Sheets

Fig.7

MOUNTING MANAGEMENT TABLE 692

| LOGICAL UNIT IDENTIFICATION NUMBER 6921 | USER INFORMATION 6922 | iSCSI MOUNTING INFORMATION 6924 | HOST INFORMATION 6926 | MOUNTING INFORMATION 6928 |
|---|---|---|---|---|
| LU0001 | USER0001 | 12.34.56.78:3866 Target.1000.001 Initiator.100.001 | xxx.xxx.xxx.1 | HOST MOUNTED |
| LU0002 | USER0002 | 12.34.56.78:3866 Target.1000.002 Initiator.100.002 | – | MAINTENANCE |
| LU0003 | USER0003 | 12.34.56.78:3866 Target.1000.003 Initiator.100.003 | – | UNMOUNTED |
| ... | ... | ... | ... | ... |

Fig.8

MAINTENANCE MANAGEMENT TABLE 694

| MAINTENANCE REGISTRATION NUMBER 6941 | LOGICAL UNIT IDENTIFICATION NUMBER 6942 | MAINTENANCE TYPE NUMBER 6943 | TYPE NAME INFORMATION 6944 | MODE INFORMATION 6945 | REQUESTOR INFORMATION 6946 | STATUS INFORMATION 6948 |
|---|---|---|---|---|---|---|
| MR0001 | LU0001 | MT0001 | MEMORY EXPANSION | EXPANDED CAPACITY: 10 GB | 98.76.54.32 | WAITING |
| MR0002 | LU0002 | MT0003 | VIRUS SCAN | QUICK SCAN | xx.xx.xx.4 | EXECUTING |
| MR0003 | LU0003 | MT0004 | BACKUP | FULL BACKUP | 98.76.54.32 | COMPLETED |
| ... | ... | ... | ... | ... | ... | ... |

Fig.9

MAINTENANCE PRIORITY TABLE 696

| MAINTENANCE TYPE NUMBER | TYPE NAME INFORMATION | PRIORITY INFORMATION |
|---|---|---|
| MT0001 | MEMORY EXPANSION | NONINTERRUPTIBLE |
| MT0002 | LOGICAL UNIT INITIALIZATION | NONINTERRUPTIBLE |
| MT0003 | VIRUS SCAN | INTERRUPTIBLE |
| MT0004 | BACKUP | INTERRUPTIBLE |
| MT0005 | SOFTWARE INSTALLATION | INTERRUPTIBLE |
| MT0006 | SOFTWARE UPGRADE | INTERRUPTIBLE |
| ⋮ | ⋮ | ⋮ |

MANAGEMENT OF ACCESS TO STORAGE AREA OF STORAGE SYSTEM

CROSS-REFERENCE TO RELATED APPLICATIONS

The present application claims the priority based on Japanese Patent Application No. 2006-308917 filed on Nov. 15, 2006, the disclosure of which is hereby incorporated by reference in its entirety.

BACKGROUND

1. Technical Field

The present invention relates to storage technology for providing a host computer system with a storage area of a storage system via a network, and relates in particular to technology for providing, via a network, a storage area to a host computer system to which a thin client system is applied.

2. Related Art

In a computer system equipped with a storage system and host computer system, maintenance items of various kinds are performed on the storage area of the storage system, so as to permit the host computer system to effective access the storage area provided by the storage system. Maintenance items performed on the storage area of the storage system include backup of data saved to the storage area, expanding the storage volume of the storage area, initialization of the storage area, and so on. Technology for executing maintenance on the storage area of a storage system are disclosed in JP A-2005-122611 and JP A-2004-38934

SUMMARY

While it has been contemplated to implement a thin client system in a host computer system with the aim of preventing information leakage in a computer system, to date there has not been adequate consideration with regard to maintenance of the storage area in the storage system, in situations where a thin client system has been implemented. For example, in a host computer system implementing a thin client system, since it is necessary to be able to mount the storage area of the storage system at arbitrary timing in response to a request from the thin client, it is possible that data that has been saved to the storage area in the storage system could become corrupted, in the event that mounting of the storage area by the host computer system and maintenance of the same storage area were carried out simultaneously.

With the foregoing in view, it is an advantage of some aspects of the invention to provide a storage technology for use in a computer system that provides a host computer system with a storage area in the storage system, adapted to prevent mounting of the storage area by the host computer system and maintenance of the storage area from being carried out simultaneously.

The invention in a storage management system pertaining to a first aspect thereof provides a storage management system for a computer system comprising: a storage system providing a storage area for storing data; a host computer system for mounting the storage area of the storage system via a network; and a maintenance system for performing maintenance of the storage area in the storage system; adapted for managing access to the storage system and comprising: a mounting decision portion for deciding, according to a preestablished maintenance schedule, whether the host computer system is currently mounting the storage area in the storage system; a maintenance execution command portion that, in the event of a decision by the mounting decision portion that the host computer system is not currently mounting the storage area, generates a command to the maintenance system to execute the scheduled maintenance; a Host On detecting portion for detecting booting of the host computer system; a maintenance decision portion that, in response to detection of booting of the host computer system by the Host On detecting portion, decides whether the maintenance system is currently performing maintenance of the storage area in the storage system; and a mounting enabling portion that, in the event of a decision by the maintenance decision portion that the maintenance system is not currently performing maintenance of the storage area, enables the host computer system to mount the storage area in the storage system. According to this storage management system, maintenance items to be performed on the storage area of the storage system will be executed at times that the host computer system is not currently mounting the storage area, whereas mounting by the host computer system will be executed at times that maintenance is not currently being performed. As a result, it is possible to prevent mounting of the storage area by the host computer system and maintenance of the storage area from being carried out simultaneously.

The invention in a computer system pertaining to another aspect thereof provides a computer system comprising a storage system providing a storage area for storing data; a host computer system for mounting the storage area of the storage system via a network; and a maintenance system for performing maintenance of the storage area in the storage system; the computer system comprising: a mounting decision portion for deciding, according to a preestablished maintenance schedule, whether the host computer system is currently mounting the storage area in the storage system; a maintenance execution command portion that, in the event of a decision by the mounting decision portion that the host computer system is not currently mounting the storage area, generates a command to the maintenance system to execute the scheduled maintenance; a Host On detecting portion for detecting booting of the host computer system; a maintenance decision portion that, in response to detection of booting of the host computer system by the Host On detecting portion, decides whether the maintenance system is currently performing maintenance of the storage area in the storage system; and a mounting enabling portion that, in the event of a decision by the maintenance decision portion that the maintenance system is not currently performing maintenance of the storage area, enables the host computer system to mount the storage area in the storage system. According to this computer system, maintenance items to be performed on the storage area of the storage system will be executed at times that the host computer system is not currently mounting the storage area, whereas mounting by the host computer system will be executed at times that maintenance is not currently being performed. As a result, it is possible to prevent mounting of the storage area by the host computer system and maintenance of the storage area from being carried out simultaneously.

The invention in a mounting management system pertaining to yet another aspect thereof provides a storage management method for a computer system comprising a storage system providing a storage area for storing data; a host computer system for mounting the storage area of the storage system via a network; and a maintenance system for performing maintenance of the storage area in the storage system; the storage management method being adapted for managing access to the storage system and comprising the steps of: the computer deciding, according to a preestablished maintenance schedule, whether the host computer system is currently mounting the storage area in the storage system; in the event of a decision by the mounting decision portion that the host computer system is not currently mounting the storage area, the computer instructing the maintenance system to execute the scheduled maintenance; the computer detecting booting of the host computer system; the computer, in response to detection of booting of the host computer system by the Host On detecting portion, deciding whether the maintenance system is currently performing maintenance of the storage area in the storage system; and the computer, in the event of a decision by the maintenance decision portion that the maintenance system is not currently performing maintenance of the storage area, enabling the host computer system to mount the storage area in the storage system. According to this storage management method, maintenance items to be performed on the storage area of the storage system will be executed at times that the host computer system is not currently mounting the storage area, whereas mounting by the host computer system will be executed at times that maintenance is not currently being performed. As a result, it is possible to prevent mounting of the storage area by the host computer system and maintenance of the storage area from being carried out simultaneously.

The embodiments of the invention are not limited to the aspects of a storage management system, computer system, and mounting management method discussed above, and may be reduced to practice in various other forms, for example, a host computer, a storage system, a maintenance system, or other systems making up a computer system; as well as a program for accomplishing the functions of such systems by means of a computer, a computer-readable recording medium having such a program recorded thereon, and so on. The invention is not limited to the embodiments described above, and may assume various other embodiments without departing from the spirit of the invention.

These and other objects, features, aspects, and advantages of the invention will become more apparent from the following detailed description of the preferred embodiments with the accompanying drawings.

BRIEF DESCRIPTION OF THE DRAWINGS

The invention will be described with reference to the accompanying drawings, wherein like numbers reference like elements.

FIG. 7 is an illustration depicting an example of the mounting management table 692 stored in the memory 620 of the storage management system 60.

FIG. 8 is an illustration depicting an example of the maintenance management table 694 stored in the memory 620 of the storage management system 60.

FIG. 9 is an illustration depicting an example of the maintenance priority table 696 stored in the memory 620 of the storage management system 60.

DESCRIPTION OF THE PREFERRED EMBODIMENTS

A fuller understanding of the constitution and working effects of the invention set forth above shall be provided through the following description of a computer system embodying the invention.

A. Design of Computer System

Figure 1:
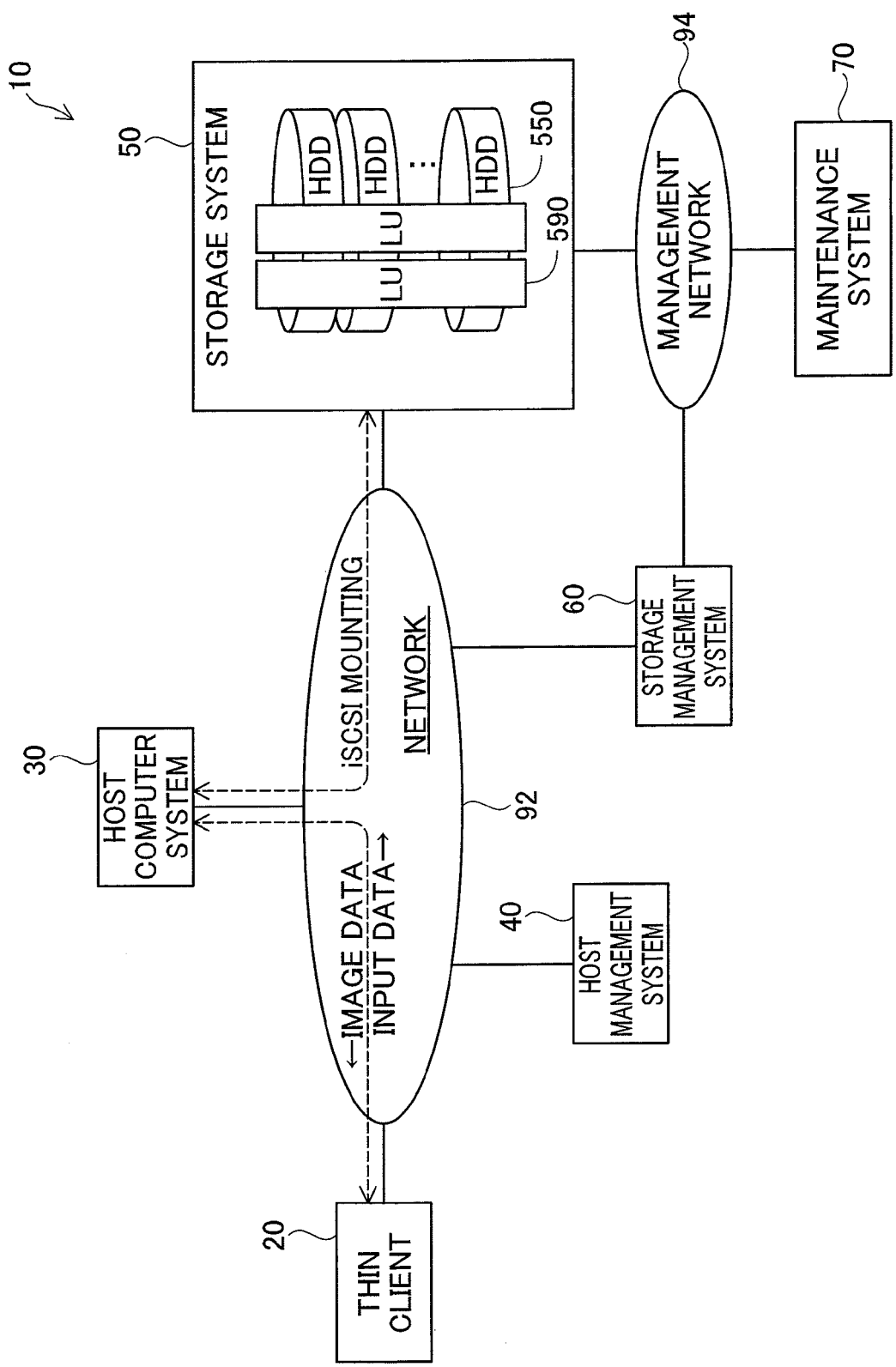
FIG. 1 is an illustration of the general design of a computer system 10.

FIG. 1 is an illustration of the general design of a computer system 10. The computer system 10 comprises a storage system 50 providing a storage area for storing data; a host computer system 30 for mounting and performing data read/write operations on the storage area provided by the storage system 50; a thin client 20 for carrying out data processing in cooperation with the host computer system 30 under uniform management by the host computer system 30; a host management system 40 for managing operation of the host computer system 30 and the thin client 20; a maintenance system 70 for maintenance and management of the storage area of the storage system 50; and a storage management system 60 for managing operation of the host computer system 30 and the maintenance system 70. For the purpose of simplifying the drawing, only a single thin client 20 is depicted in FIG. 1; in actual practice the computer system 10 would be furnished with a multiplicity of thin clients 20.

The computer system 10 of FIG. 1 further comprises a network 92 interconnecting the thin client 20, the host computer system 30, the host management system 40, the storage system 50, and the storage management system 60 to enable communication among these systems; and a management network 94 interconnecting the storage system 50, the storage management system 60, and the maintenance system 70 to enable communication among these systems. In the embodiment, the management network 94 is separate from the network 92; however, as another embodiment, it would be acceptable for the management network 94 to constitute part of the network 92. In the embodiment, data transmission over the network 92 and the management network 94 is carried out based on TCP/IP (Transmission Control Protocol/Internet Protocol).

In the embodiment, the storage system 50 of the computer system 10 provides the host computer system 30 with a storage area composed of logical units (LU) 590 logically configured by managing a multiplicity of hard disk drives (HDD) 550 using RAID (Redundant Arrays of Independent (Inexpensive) Disks) technology. The storage devices making up the LU 590 of the storage system 50 are not limited to HDD; semiconductor memory, or a combination of HDD and semiconductor memory, could be used instead.

In the embodiment, the host computer system 30 of the computer system 10 boots in response to a boot request from the thin client 20. During booting, the host computer system 30, under management by the host management system 40 and the storage management system 60, mounts the LU 590 of the storage system 50 via the network 92. In the embodiment, communication between the host computer system 30 and the storage system 50 takes place in accordance with iSCSI (Internet Small Computer System Interface) specifications; however, as another embodiment, it would be acceptable for communications to be carried out in accordance with Fibre Channel (FC) specifications. For example, where connections are made in accordance with Fibre Channel as another embodiment, the computer system 10 would be furnished with a separate Fibre Channel network (FC network), and the host computer system 30 and storage system 50 would each be equipped with a Fibre Channel network adaptor for exchanging data over the FC network, connecting these systems to the FC network.

In the embodiment, once the host computer system 30 has mounted the LU 590 of the storage system 50 and booted, input data received by the thin client 20 from a user will be transmitted from the thin client 20 to the host computer system 30. The host computer system 30 having received the input data from the thin client 20 now performs computations of various kinds using the LU 590 of the storage system 50. The results of the computations performed by the host computer system 30 are transmitted as image data from the host computer system 30 to the thin client 20. The thin client 20 then displays the image data transmitted to it from the host computer system 30.

Figure 2:
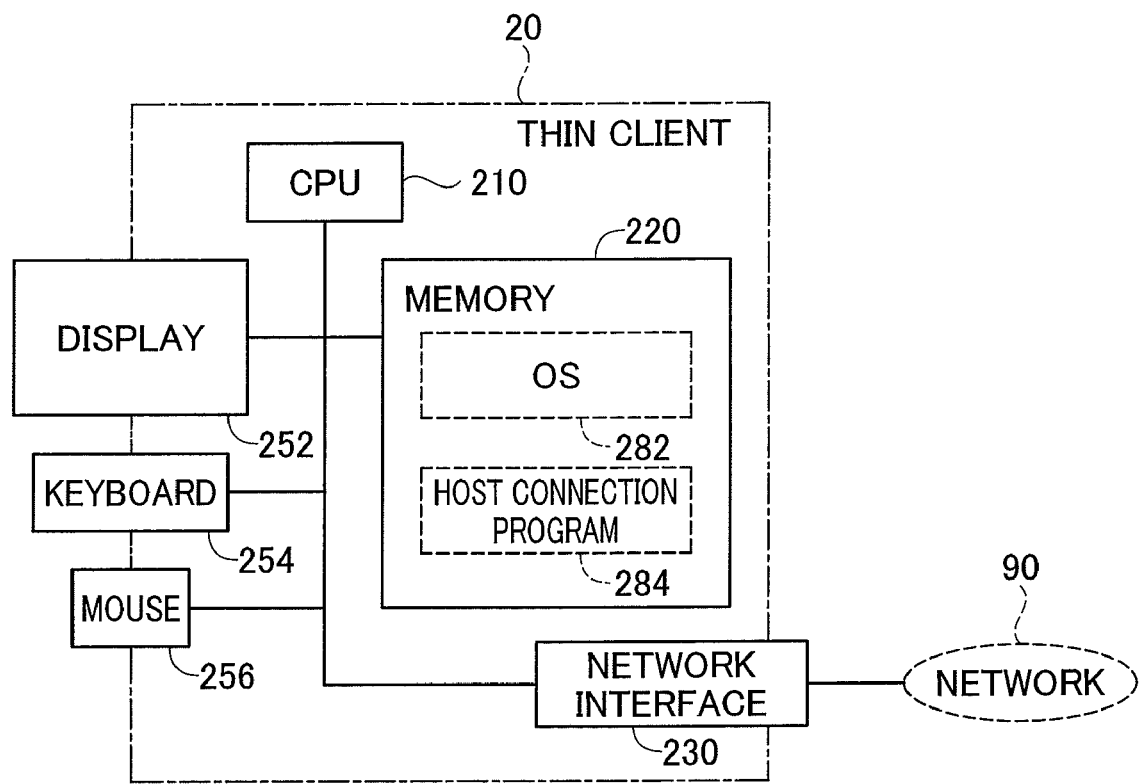
FIG. 2 is an illustration primarily depicting in detail the arrangement of the thin client 20 in the computer system 10.

FIG. 2 is an illustration primarily depicting in detail the arrangement of the thin client 20 in the computer system 10. The thin client 20 of the computer system 10 comprises a central processing unit (hereinafter "CPU") 210 for controlling the various parts of the thin client 20; a memory 220 for storing the data being handled by the CPU 210; a network interface 230 for exchange of data via the network 92; a display 252 for displaying images; and a keyboard 254 and mouse 256 for receiving control inputs from the user.

In the memory 220 of the thin client 20 are stored an operating system (OS) 282 as the program for operating the CPU 210, as well as application software of various kinds. In the embodiment, the application software stored in the memory 220 includes a host connection program 284 for execution by CPU 210 to perform the function of connecting to the host computer system 30 for the purpose of operation as a user terminal of the thin client system.

Figure 3:
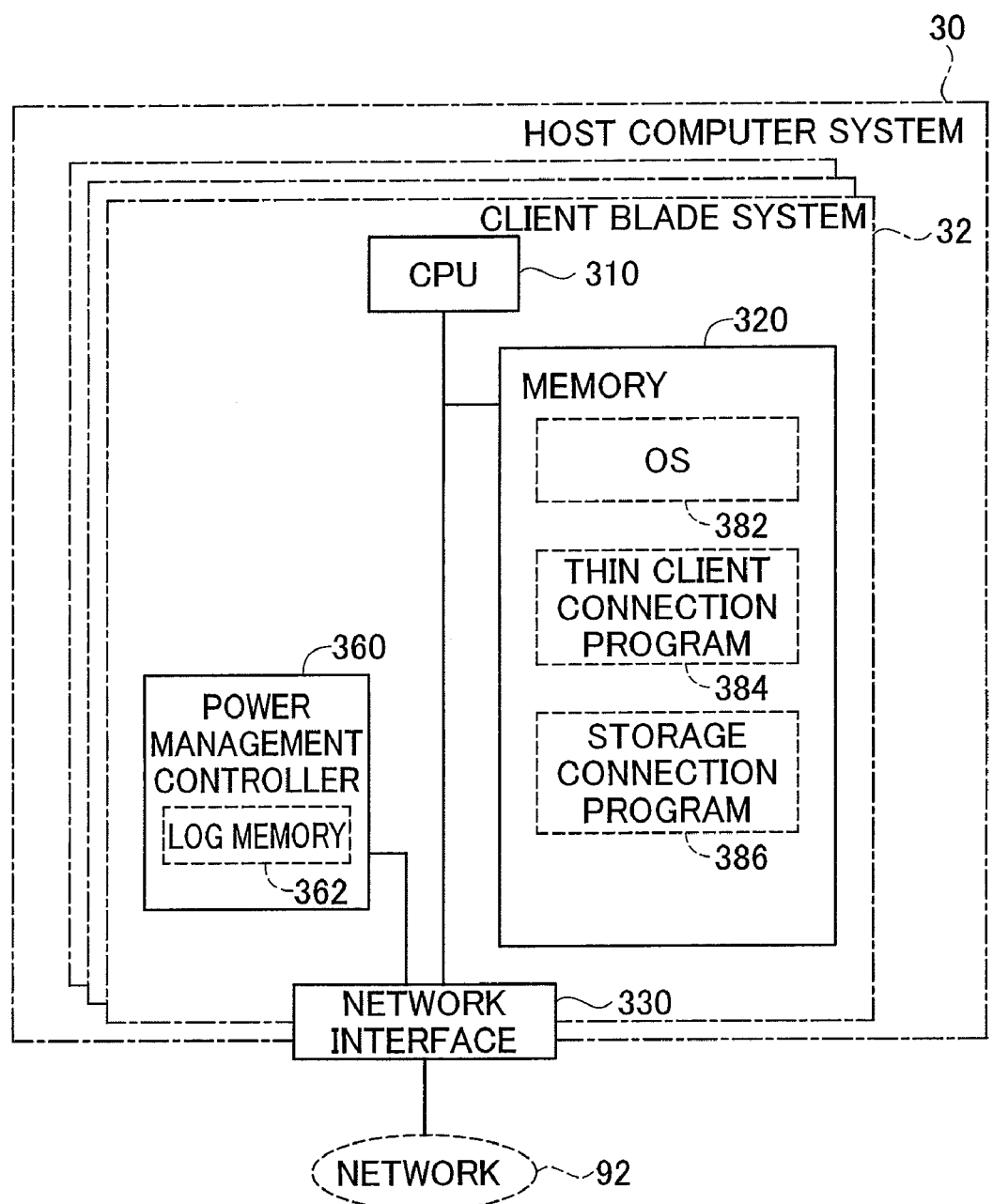
FIG. 3 is an illustration primarily depicting in detail the arrangement of the host computer system 30 in the computer system 10.

FIG. 3 is an illustration primarily depicting in detail the arrangement of the host computer system 30 in the computer system 10. The host computer system 30 of the computer system 10 is furnished with a multiplicity of client blade systems 32 associated on an individual basis with the multiplicity of thin clients 20. In the embodiment, each of the multiplicity of client blade systems 32 is equipped with the function of executing data processing as a single personal computer, in place of the associated thin client 20.

The client blade system 32 of the host computer system 30 comprises a CPU 310 for controlling the various parts of the client blade system 32; a memory 320 for storing the data being handled by the CPU 310; a network interface 330 for exchange of data via the network 92; and a power management controller 360 for performing power control (Power On/Off/Restart) of the client blade system 32 in accordance with IPMI (Intelligent Platform Management Interface) specifications. The power management controller 360 of the client blade system 32 is furnished with a log memory portion 362 for saving a communications log in accordance with IPMI specifications. In the embodiment, the power management controller 360 includes a one-chip microcomputer with IPMI firmware.

In the memory 320 of the client blade system 32 are stored an operating system 382 as the program for operating the CPU 310, as well as application software of various kinds. In the embodiment, the application software stored in the memory 320 includes a thin client connection program 384 for execution by CPU 310 to perform the function of connecting to the thin client 20 for the purpose of operation as a server of the thin client system; and a storage connection program 386 for execution by CPU 310 to perform the function of mounting and unmounting the LU 590 of the storage system 50.

In the embodiment, since user data such as application software controlled by the user of the thin client 20 or files are saved to the LU 590 of the storage system 50, the client blade system 32 of the host computer system 30 is not furnished with an HDD or semiconductor memory for the purpose of saving this user data; however, as an alternative embodiment, the client blade system 32 could be furnished with an HDD or semiconductor memory for the purpose of saving the user data concomitantly with the LU 590 of the storage system 50.

Figure 4:
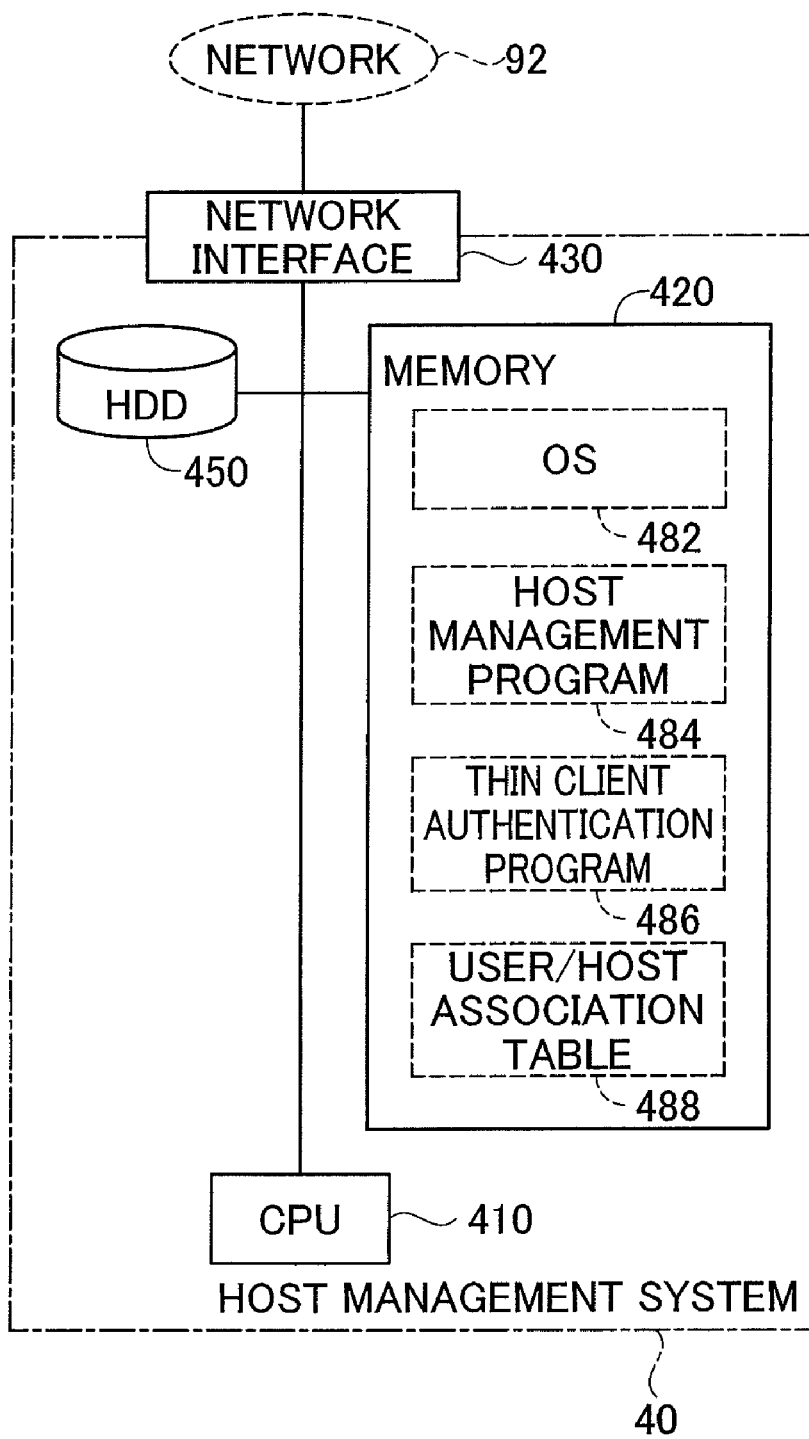
FIG. 4 is an illustration primarily depicting in detail the arrangement of the host management system 40 in the computer system 10.

FIG. 4 is an illustration primarily depicting in detail the arrangement of the host management system 40 in the computer system 10. The host management system 40 of the computer system 10 comprises a CPU 410 for controlling the various parts of the host management system 40; a memory 420 and an HDD 450 for storing the data being handled by the CPU 410; and a network interface 430 for exchange of data via the network 92.

In the memory 420 of the host management system 40 are stored an operating system 482 as the program for operating the CPU 410, as well as application software of various kinds. In the embodiment, the application software stored in the memory 420 includes a host management program 484 for execution by CPU 410 to perform the function of overall operational management of the multiplicity of client blade systems 32 included in the host computer system 30; and a thin client authentication program 486 for execution by CPU 410 to carry out the function of performing access authentication when the thin client 20 accesses the host computer system 30. In the embodiment, the host management program 484 of the host management system 40 includes a program for execution by CPU 410 to perform the function of requesting the storage management system 60 to perform maintenance of the LU 590 of the storage system 50. By way of data for the purpose of operational management of the host computer system 30, there is saved in the memory 420 of the host management system 40 a user/host association table 488 that stores associations between thin client 20 users and the host computer system 30.

Figure 5:
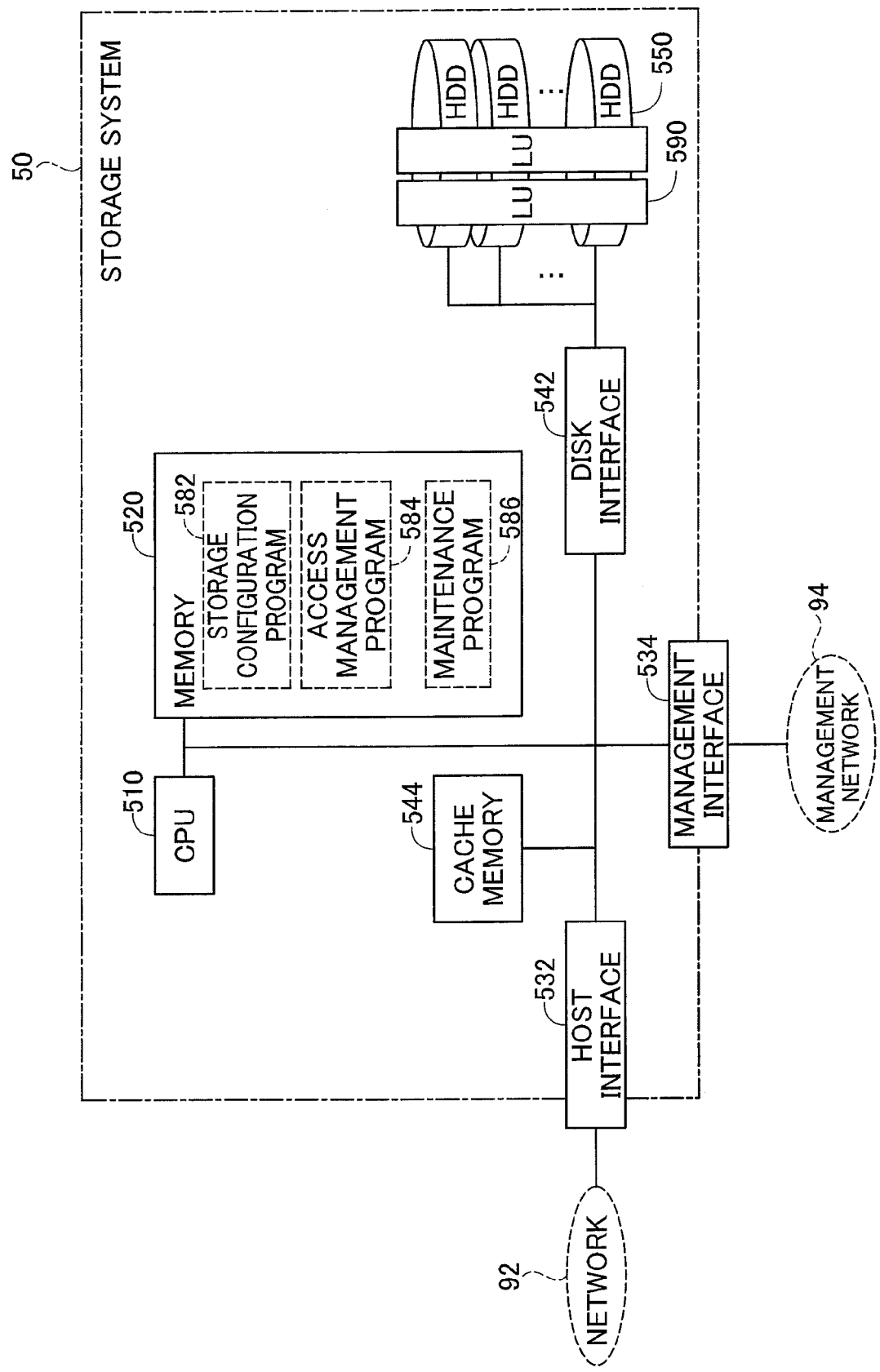
FIG. 5 is an illustration primarily depicting in detail the arrangement of the storage system 50 in the computer system 10.

FIG. 5 is an illustration primarily depicting in detail the arrangement of the storage system 50 in the computer system 10. The storage system 50 of the computer system 10 comprises a multiplicity of HDD 550 for constituting the LU 590; it further comprises a CPU 510 for controlling the various parts of the storage system 50; a memory 520 for storing the data being handled by the CPU 510; a host interface 532 for exchange of data with the host computer system 30 via the network 92; a disk interface 542 for exchange of data with the multiplicity of HDD 550; a cache memory 544 for temporarily holding data exchanged between the host interface 532 and the disk interface 542; and a management interface 534 for exchange of data with the management network 94.

Various programs for operating the CPU 510 are stored in the memory 520 of the storage system 50. In the embodiment, the programs stored in the memory 520 include a storage configuration program 582 for execution by CPU 510 to perform the function of logical configuration of the LU 590 by managing the multiplicity of HDD 550 using RAID technology; an access management program 584 for execution by CPU 510 to perform the function of providing the LU 590 as the iSCSI target for access by the host computer system 30 or the maintenance system 70 as the iSCSI initiator; and a maintenance program 586 for execution by CPU 510 to perform maintenance functions on the LU 590 such as backup, memory capacity expansion, initialization, and so on, based on commands from the maintenance system 70.

Figure 6:
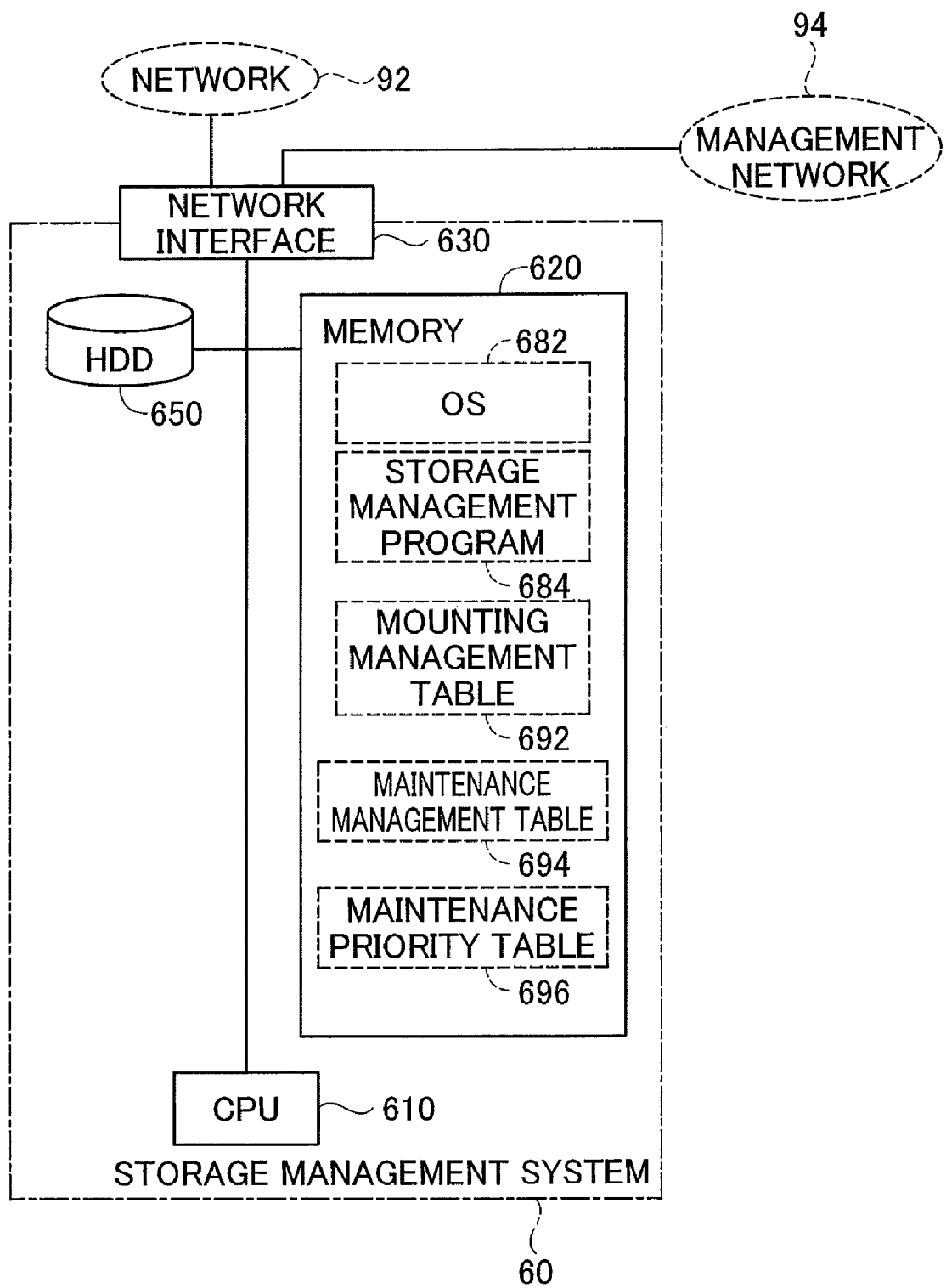
FIG. 6 is an illustration primarily depicting in detail the arrangement of the storage management system 60 in the computer system 10.

FIG. 6 is an illustration primarily depicting in detail the arrangement of the storage management system 60 in the computer system 10. The storage management system 60 of the computer system 10 comprises a CPU 610 for controlling the various parts of the storage management system 60; a memory 620 and an HDD 650 for storing the data being handled by the CPU 610; and a network interface 630 for exchange of data via the network 92.

In the memory 620 of the storage management system 60 are stored an operating system 682 as the program for operating the CPU 610, as well as application software of various kinds. In the embodiment, the application software stored in the memory 620 includes a storage management program 684 for execution by CPU 610 to perform the function of managing access to the LU 590 of the storage system 50 by the host computer system 30 and the maintenance system 70. As the data for the purpose of managing access to the LU 590 of the storage system 50, in the memory 620 of the storage management system 60 there are stored a mounting management table 692 containing data for managing mounting and maintenance status in the LU 590 of the storage system 50; a maintenance management table 694 containing data for managing scheduling of maintenance of the LU 590 of the storage system 50; and a maintenance priority table 696 containing data for managing priority of mounting of the LU 590 by the host computer system 30 vis-à-vis maintenance of the LU 590 by the maintenance system 70.

FIG. 7 is an illustration depicting an example of the mounting management table 692 stored in the memory 620 of the storage management system 60. The mounting management table 692 of the storage management system 60 includes a table column 6921 containing logical unit identification numbers identifying each LU 590 of the storage system 50; a table column 6922 containing user information identifying the user who has authorization to use the LU 590 through the thin client 20; a table column 6924 containing iSCSI mounting information used by the host computer system 30 to mount the LU 590; a table column 6926 containing host information identifying the host computer system 30 that is currently mounting the LU 590; and a table column 6928 containing mounting information indicating mounting status in the LU 590.

In the embodiment, the table column 6924 of the mounting management table 692 contains, by way of iSCSI mounting information associated with a particular LU 590 of the storage system 50, an IP (Internet Protocol) address indicating the location of the particular LU 590 on the network 92, an iSCSI initiator name for the purpose of mounting the LU 590, and an iSCSI target name assigned to the LU 590.

In the embodiment, the table column 6926 of the mounting management table 692 contains, by way of host information associated with a particular LU 590 of the storage system 50, an IP address indicating a location on the network 92 for the host computer system 30 which is currently mounting the particular LU 590. In the embodiment, host information for the host computer system 30 is stored to the table column 6926 of the mounting management table 692 when the host computer system 30 mounts the LU 590 of the storage system 50; this host information is subsequently deleted when the host computer system 30 unmounts the LU 590 of the storage system 50.

In the embodiment, the table column 6928 of the mounting management table 692 contains, by way of mounting information associated with a particular LU 590 of the storage system 50, mounting information indicating one of the states "Host Mounted," "Unmounted" or "Maintenance." Mounting information indicating "Host Mounted" status shows that the LU 590 in question is currently mounted by the host computer system 30. Mounting information indicating "Unmounted" status shows that the LU 590 in question is not currently mounted by the host computer system 30. Mounting information indicating "maintenance" status shows that the LU 590 in question is receiving maintenance by the maintenance system 70.

FIG. 8 is an illustration depicting an example of the maintenance management table 694 stored in the memory 620 of the storage management system 60. The maintenance management table 694 of the storage management system 60 includes a table column 6941 containing maintenance registration numbers identifying each particular maintenance item registered in the maintenance management table 694, a table column 6942 containing logical unit identifying numbers identifying a particular LU 590 of the storage system 50 targeted for the particular maintenance item; a table column 6943 containing a maintenance type number identifying the type of maintenance item; a table column 6944 containing type name information indicating the name of the type of maintenance item; a table column 6945 containing mode information indicating the execution mode of the maintenance item; a table column 6946 containing requester information identifying the requestor that requested the storage management system 60 for setup registration of the maintenance item; and a table column 6948 containing status information indicating the execution status of the maintenance item.

In the embodiment, the table column 6945 of the maintenance management table 694 contains as mode information indicating the execution mode of the maintenance item, for example, where the type of maintenance is "memory capacity expansion," information indicating the expansion capacity by which the LU 590 of the storage system 50 is to be expanded; where the type of maintenance is "virus scanning," information indicating a range for scanning the LU 590 of the storage system 50; or where the type of maintenance is "backup," information indicating a range for backup of the LU 590 of the storage system 50.

In the embodiment, the table column 6946 of the maintenance management table 694 contains, as requester information identifying the requestor of a maintenance item, the IP address identifying the location of the requestor. In the embodiment, maintenance requesters include the host management system 40 and the host computer system 30.

In the embodiment, the table column 6948 of the maintenance management table 694 contains, as status information indicating the execution status of maintenance items, status information indicating "Waiting," "Executing," or "Completed" status. Status information indicating "Waiting" reflects status wherein the maintenance item is scheduled to be executed. Status information indicating "Executing" reflects status wherein the maintenance item is currently being executed. Status information indicating "Completed" reflects status wherein the maintenance item has finished executing.

FIG. 9 is an illustration depicting an example of the maintenance priority table 696 stored in the memory 620 of the storage management system 60. The maintenance priority table 696 of the storage management system 60 includes a table column 6961 containing maintenance type numbers identifying each particular type of maintenance performed on the LU 590 of the storage system 50; a table column 6962 containing maintenance type names identifying the name of the type of maintenance performed on the LU 590 of the storage system 50; and a table column 6964 containing priority information indicating priority of the maintenance vis-à-vis mounting by the host computer system 30.

In the embodiment, types of maintenance specified in the maintenance priority table 696 include "memory expansion" to expand the established memory size in the LU 590 of the storage system 50; "logical unit initialization" to initialize the storage area established in the LU 590; "virus scanning" to scan the storage area of the LU 590 for computer viruses; "backup" to save a copy of data stored in the storage area of the LU 590; "software install" to install software in the storage area of the LU 590 so as to be utilizable by the thin client 20; and "software upgrade" to upgrade software already installed in the storage area of the LU 590.

In the embodiment, the table column 6964 of the maintenance priority table 696 contains, as priority information indicating priority of maintenance items vis-à-vis mounting by the host computer system 30, information indicating whether a particular maintenance item should be interrupted in the event that the maintenance item is currently being executed on the LU 590 of the storage system 50 which the host computer system 30 is requesting to mount. In the embodiment, types of maintenance which will not be interrupted in the event of a request to mount by the host computer system 30 include "memory expansion" and "logical unit initialization." In the embodiment, types of maintenance which will be interrupted in the event of a request to mount by the host computer system 30 include "virus scanning," "backup," "software install," and "software upgrade."

Figure 10:
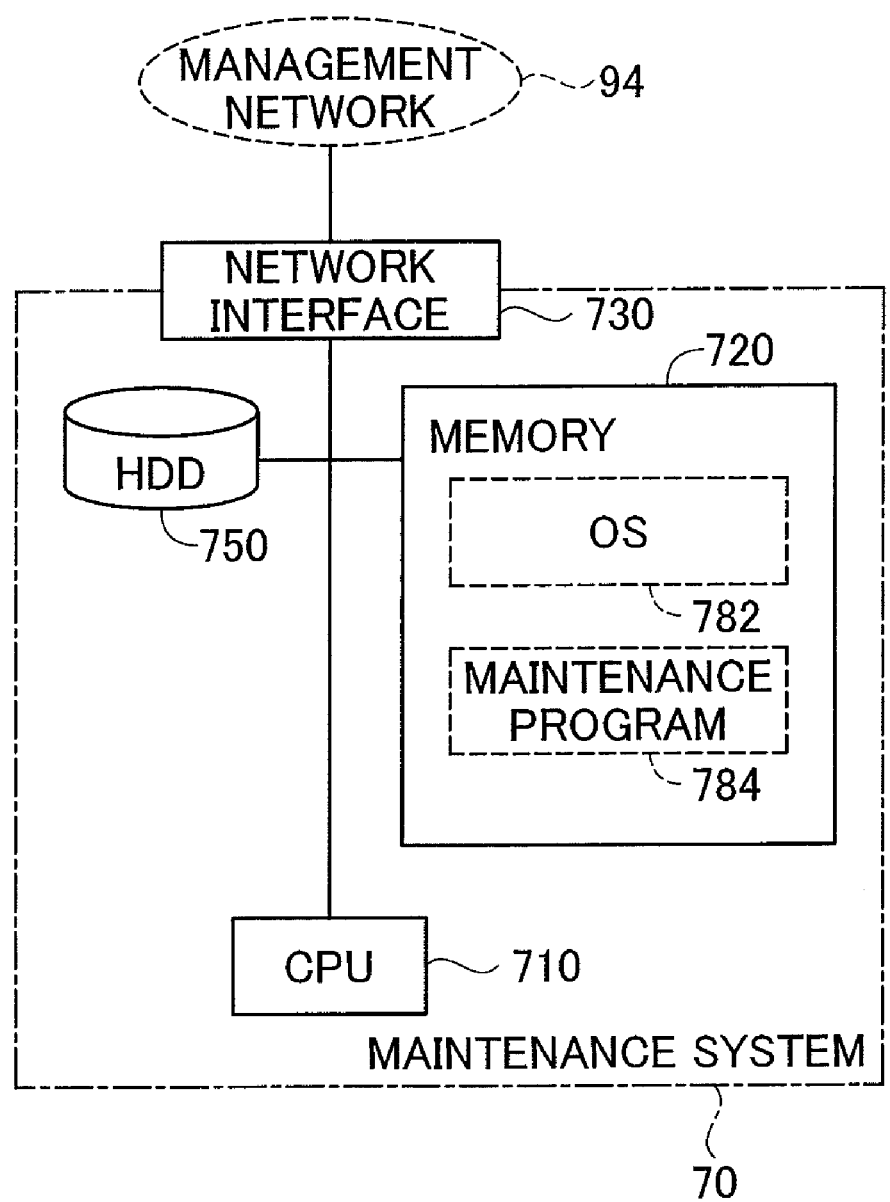
FIG. 10 is an illustration primarily depicting in detail the arrangement of the maintenance system 70 in the computer system 10.

FIG. 10 is an illustration primarily depicting in detail the arrangement of the maintenance system 70 in the computer system 10. The maintenance system 70 in the computer system 10 comprises a CPU 710 for controlling the various parts of the maintenance system 70; a memory 720 and an HDD 750 for storing the data being handled by the CPU 710; and a network interface 730 for exchange of data via the maintenance network 94.

In the memory 720 of the maintenance system 70 are stored an operating system 782 as the program for operating the CPU 710, as well as application software of various kinds. In the embodiment, the application software stored in the memory 720 includes a maintenance program 784 for execution by the CPU 710 to perform the function of executing maintenance on the LU 590 of the storage system 50, based on commands from the storage management system 60.

B. Operation of Computer System

B1. Mounting Operation

Figure 11:
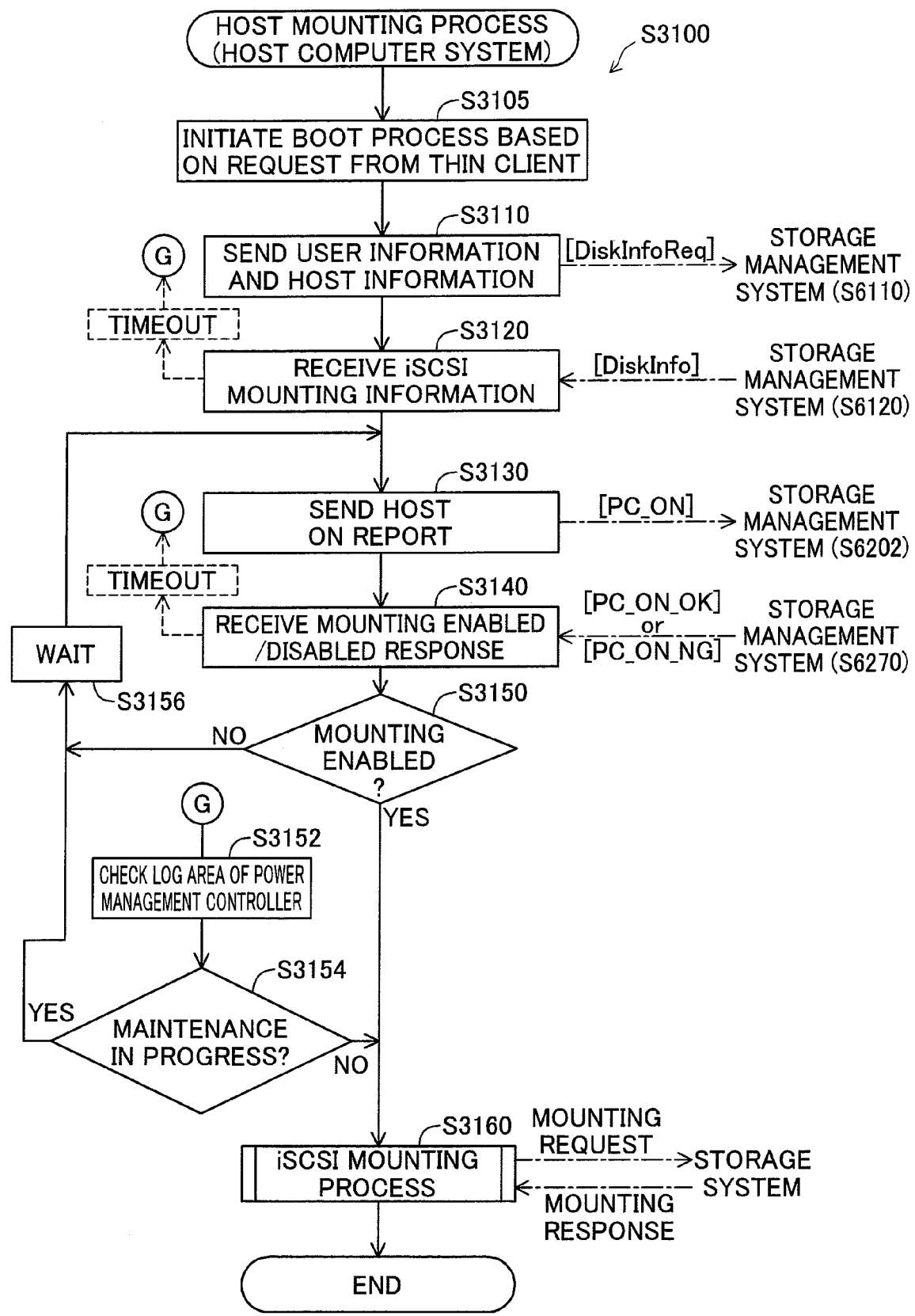
FIG. 11 is a flowchart depicting the host mounting process (Step S3100) executed by the host computer system 30 in the computer system 10.

FIG. 11 is a flowchart depicting the host mounting process (Step S3100) executed by the host computer system 30 in the computer system 10. The host mounting process (Step S3100) of FIG. 11 includes a process for booting the host computer system 30 as the server of the thin client system, based on a request from the thin client 20. In the embodiment, the host mounting process (Step S3100) of FIG. 11 is accomplished by operation on the basis of software, by the CPU 310 of the host computer system 30. In the embodiment, once the power management controller 360 of the host computer system 30, on the basis of an IPMI command from the thin client 20, has turned on the power powering the client blade system 32 of the host computer system 30, the host computer system 30 initiates the host mounting process (Step S3100) of FIG. 11.

When the host computer system 30 of the computer system 10 initiates the host mounting process (Step S3100) of FIG. 11, a boot process to make initial settings for booting up as the server for the thin client system is initiated on the basis of a request from the thin client 20 (Step S3105). In the embodiment, in the boot process (Step S3105) the host computer system 30, in cooperation with the host management system 40, executes authentication of the thin client 20 using user information or a password sent from the thin client 20.

After the host computer system 30 has initiated the boot process (Step S3105), the host computer system 30 requests the storage management system 60 to provide iSCSI information for the purpose of iSCSI mounting of the LU 590 of the storage system 50 (Step S3110). In the embodiment, the host computer system 30 transmits to the storage management system 60 a command "DiskInfoReq" requesting iSCSI mounting information. In the embodiment, the command "DiskInfoReq" sent from the host computer system 30 to the storage management system 60 includes user information identifying the user of the thin client 20, and host information identifying the host computer system 30.

After the command "DiskInfoReq" has been sent to the storage management system 60 by the host computer system 30 (Step S3110), the host computer system 30 receives iSCSI mounting information from the storage management system 60 (Step S3120). In the embodiment, the host computer system 30 receives from the storage management system 60 a command "DiskInfo" that includes the iSCSI mounting information. In the embodiment, the iSCSI mounting information included in the command "DiskInfo" includes information specified in the mounting management table 692 of the storage management system 60; this information includes an IP address indicating the location of the LU 590 associated with the user information, an iSCSI initiator name for iSCSI mounting of the LU 590, and an iSCSI target name assigned to the LU 590.

After the iSCSI mounting information has been received by the host computer system 30 (Step S3120), the host computer system 30 transmits to the storage management system 60 a Host On report "PC_ON" indicating that preparation for booting to mount the LU 590 of the storage system 50 is ready (Step S3130). In the embodiment, the Host On report "PC_ON" is included in an IPMI command sent from the host computer system 30 to the storage management system 60.

After the Host On report "PC_ON" has been sent by the host computer system 30 (Step S3130), the host computer system 30 receives from the storage management system 60 a mounting enabled/disabled response indicating whether iSCSI mounting is enabled or disabled (Step S3140). In the embodiment, the mounting enabled/disabled response includes either a command "PC_ON_OK" indicating that iSCSI mounting is enabled, or a command "PC_ON_NG" indicating that iSCSI mounting is disabled.

In the event that the mounting enabled/disabled response is that mounting is enabled (Step S3150), the host computer system 30 executes a iSCSI mounting process for mounting the LU 590 of the storage system 50, on the basis of the iSCSI mounting information received from the storage management system 60 (Step S3160). In the embodiment, in the iSCSI mounting process (Step S3160), after the mounting request has been sent from the host computer system 30 which is the iSCSI initiator to the LU 590 of the storage system 50 which is the iSCSI target, a mounting response is sent back from the storage system 50 to the host computer system 30, whereby mounting of the LU 590 is executed by the host computer system 30.

On the other hand, in the event that the mounting enabled/disabled response is that mounting is disabled (Step S3150), the host computer system 30 goes into standby for a predetermined time interval (e.g. of 10 seconds) (Step S3156), and subsequently executes the process described above, beginning from transmission of the Host On report "PC_ON" (Step S3130).

In the event of a timeout, i.e. where a timeout interval (e.g. of 10 seconds) has elapsed without receiving the aforementioned iSCSI mounting information (Step S3120) or receiving the mounting enabled/disabled response (Step S3140), the host computer system 30 checks the maintenance information that has been recorded as the IPMI communications log in the log memory portion 362 of the power management controller 360 (Step S3152), and decides whether the LU 590 of the storage system 50 targeted for mounting is currently under maintenance (Step S3154). Recording of maintenance information in the log memory portion 362 of the power management controller 360 shall be described in detail later.

In the event that the maintenance information recorded in the log memory portion 362 indicates that maintenance is currently being performed (Step S3154), the host computer system 30 goes into standby for a time interval (e.g. of 10 seconds) depending on the particular maintenance item (Step S3156), and subsequently executes the process described above, beginning from transmission of the Host On report "PC_ON" (Step S3130). If on the other hand, the maintenance information recorded in the log memory portion 362 indicates that maintenance is not currently being performed (Step S3154), the host computer system 30 executes the iSCSI mounting process (Step S3160). By so doing, the host computer system 30 can mount the LU 590 of the storage system 50, even in the event that the storage management system 60 is down.

Figure 12:
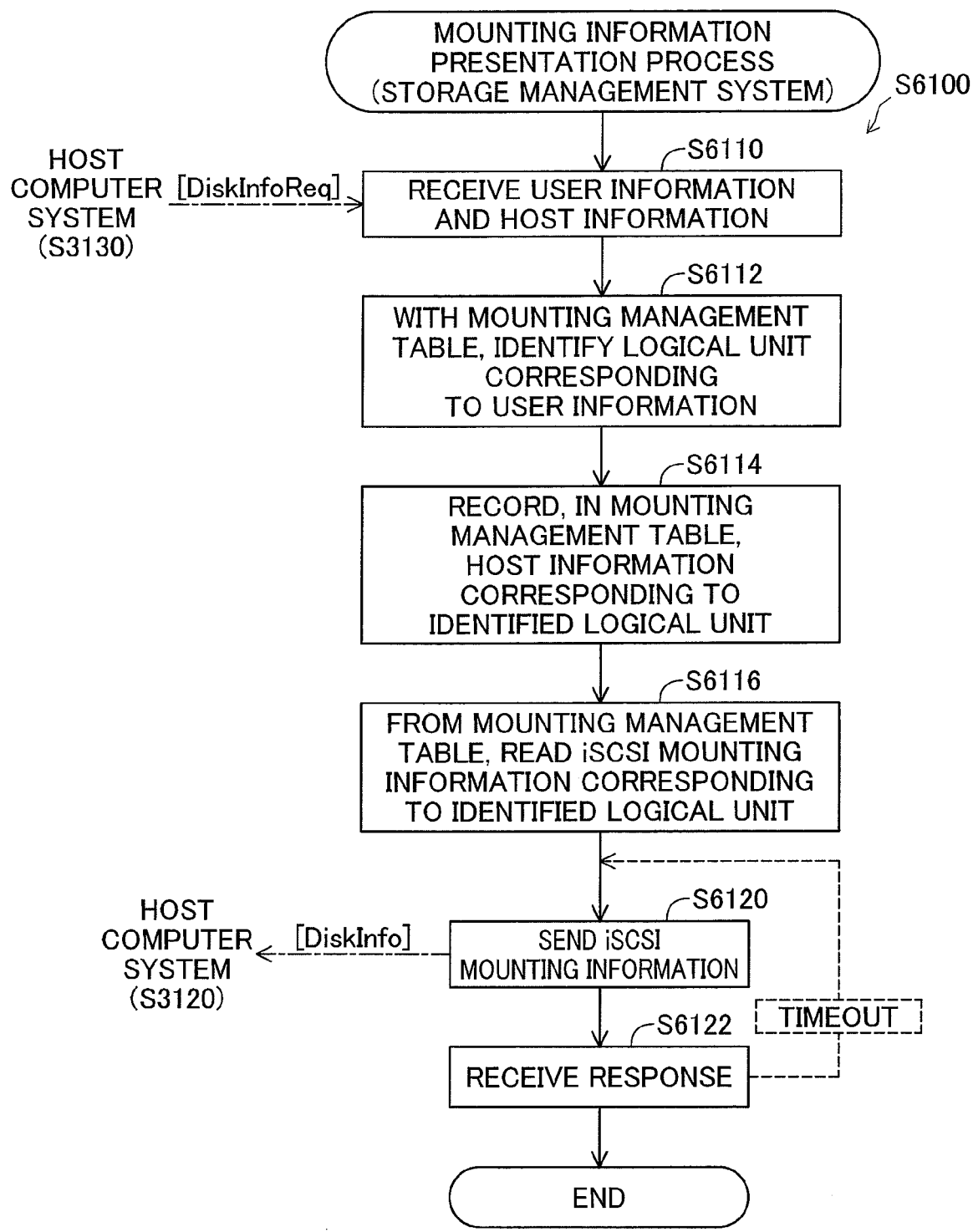
FIG. 12 is a flowchart depicting the mounting information presentation process (Step S6100) executed by the storage management system 60 in the computer system 10.

FIG. 12 is a flowchart depicting the mounting information presentation process (Step S6100) executed by the storage management system 60 in the computer system 10. The mounting information presentation process (Step S6100) of FIG. 12 includes a process for presenting mounting information to the host computer system 30. In the embodiment, the mounting information presentation process (Step S6100) of FIG. 12 is accomplished through operation of the CPU 610 of the storage management system 60 on the basis of software. In the embodiment, in the event that the command "DiskInfoReq" has been sent to the storage management system 60 by the host computer system 30 (Step S3110 of FIG. 11), the CPU 610 of the storage management system 60 initiates the mounting information presentation process (Step S6100) of FIG. 12.

Once the storage management system 60 of the computer system 10 initiates the mounting information presentation process (Step S6100) of FIG. 12, it receives from the host computer system 30 the command "DiskInfoReq" including the user information and host information (Step S6110). Subsequently, the storage management system 60 looks up in the mounting management table 692 and identifies the logical unit identification number corresponding to the user information included in the command "DiskInfoReq" received from the host computer system 30 (Step S6112). Subsequently, the storage management system 60 acquires the host information included in the command "DiskInfoReq" received from the host computer system 30, and records this information in the table column 6926 of the mounting management table 692 corresponding to the identified logical unit identification number (Step S6114). The storage management system 60 then reads from the mounting management table 692 the iSCSI mounting information corresponding to the identified logical unit identification number (Step S6116).

Subsequently, the storage management system 60 sends the host computer system 30 a command "DiskInfo" that includes the iSCSI mounting information read from the mounting management table 692 (Step S6120). In the embodiment, in the event of a timeout, i.e. where a timeout interval (e.g. of 10 seconds) has elapsed without receiving a response to the command "DiskInfo" from the host computer system 30, the storage management system 60 again transmits the command "DiskInfo" to the host computer system 30 (Step S6120).

Figure 13:
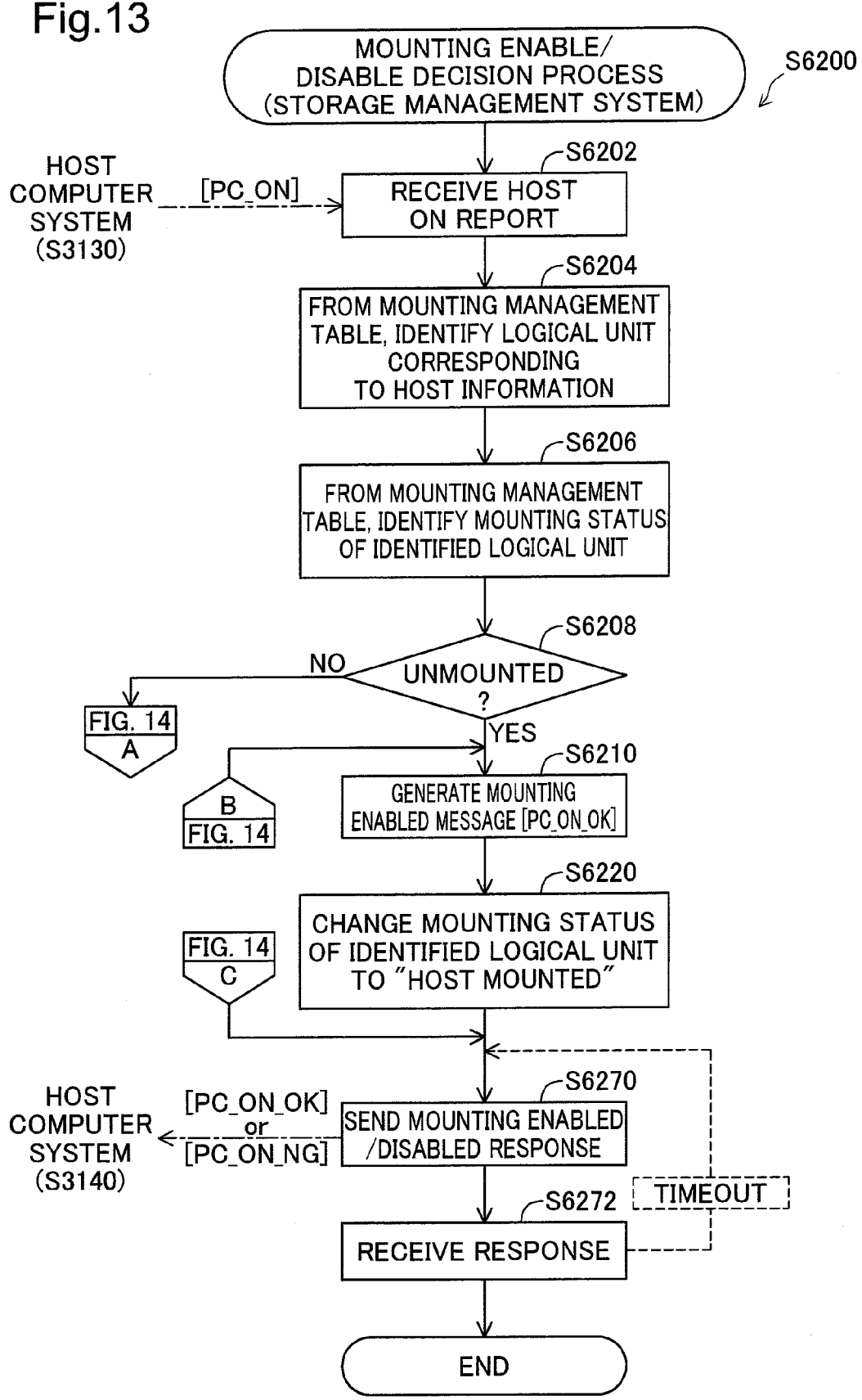
FIG. 13 is a flowchart depicting the mounting enabled/disabled decision process (Step S6200) executed by the storage management system 60 in the computer system 10.
Figure 14:
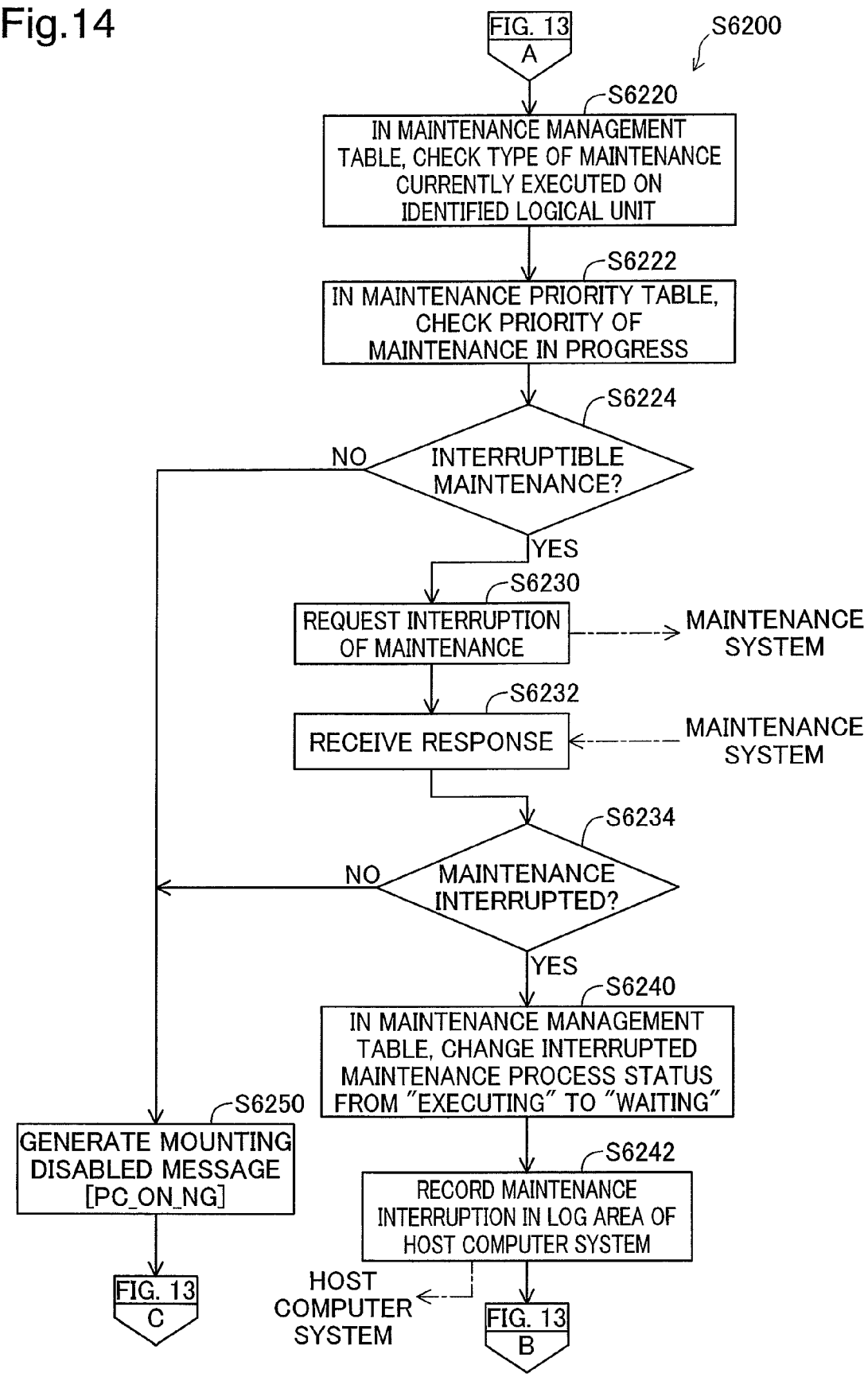
FIG. 14 is a flowchart depicting the mounting enabled/disabled decision process (Step S6200) executed by the storage management system 60 in the computer system 10.

FIG. 13 and FIG. 14 are flowcharts depicting the mounting enable/disable decision process (Step S6200) executed by the storage management system 60 in the computer system 10. The mounting enable/disable decision process (Step S6200) of FIGS. 13 and 14 includes a process for deciding whether to enable mounting by the host computer system 30. In the embodiment, the mounting enable/disable decision process (Step S6200) of FIGS. 13 and 14 is accomplished through operation of the CPU 610 of the storage management system 60 on the basis of software. In the embodiment, when the command "PC_ON" is sent to the storage management system 60 by the host computer system 30 (Step S3130 of FIG. 11), the CPU 610 of the storage management system 60 initiates the mounting enable/disable decision process (Step S6200) of FIGS. 13 and 14.

When the mounting enable/disable decision process (Step S6200) of FIGS. 13 and 14 is initiated, the storage management system 60 in the computer system 10 receives the Host On report "PC_ON" from the host computer system 30 (Step S6202). Subsequently, the storage management system 60 looks up in the mounting management table 692 and identifies the logical unit identification number corresponding to the host information included in the Host On report "PC_ON" (Step S6204). Subsequently, the storage management system 60 looks up the mounting information of the mounting management table 692 to check the mounting status in the LU 590 of the storage system 50 identified by the Host On report "PC_ON" (Step S6206).

In the event that the mounting information in the mounting management table 692 indicates "Unmounted" status (Step S6208), the storage management system 60 generates a command "PC_ON_OK" as a mount enable message enabling iSCSI mounting by the host computer system 30 (Step S6210), and changes the mounting information recorded in the table column 6928 of the mounting management table 692 from "Unmounted" to "Host Mounted" status (Step S6220). Subsequently, the storage management system 60 sends the generated command "PC_ON_OK" to the host computer system 30, by way of a mounting enabled/disabled response (Step S6270). In the embodiment, in the event of a timeout, i.e. where a timeout interval (e.g. of 10 seconds) has elapsed without receiving a response to the mounting enabled/disabled response from the host computer system 30, the storage management system 60 again transmits the mounting enabled/disabled response to the host computer system 30 (Step S6272).

On the other hand, in the event that the mounting information in the mounting management table 692 indicates "Maintenance" status (Step S6208), the storage management system 60 looks up in the maintenance management table 694 the maintenance type number, to check the type of maintenance currently being executed on the LU 590 of the storage system 50 identified by the Host On report "PC_ON" (Step S6220). Subsequently, on the basis of the maintenance type number checked from the maintenance management table 694, the storage management system 60 looks up the priority information in the maintenance priority table 696, to check the priority of the maintenance currently being executed vis-à-vis mounting by the host computer system 30.

In the event that the priority information in the maintenance priority table 696 indicates that a particular maintenance item is "interruptible" (Step S6224), the storage management system 60 requests the maintenance system 70 to interrupt the maintenance currently being executed (Step S6230). When the storage management system 60 subsequently verifies interruption of the maintenance by the maintenance system 70 (Steps S6232, S6234), it changes the status information recorded in the table column 6948 of the maintenance management table 694 from "Executing" to "Waiting" (Step S6240).

Subsequently, the storage management system 60 sends the power management controller 360 of the host computer system 30 an IPMI command that includes maintenance information indicating maintenance interruption (Step S6242). By so doing, maintenance information indicating maintenance interruption is recorded as the IPMI communications log, to the log memory portion 362 of the power management controller 360 in the host computer system 30. The maintenance information recorded to the log memory portion 362 of the host computer system 30 is looked up for the purpose of checking the maintenance process status (FIG. 11, Step S3154) in the host mounting process (FIG. 11, Step S3100) of the host computer system 30.

Returning to the discussion of FIGS. 13 and 14, after the IPMI command has been recorded in the log memory portion 362 of the host computer system 30 (Step S6242), the storage management system 60 executes the process beginning with generation of the command "PC_ON_OK" (Step S6210).

In the event that the priority information in the maintenance priority table 696 indicates that a particular maintenance item is "noninterruptible" (Step S6224), or in the event that the maintenance system 70 does not interrupt maintenance (Step S6234), the storage management system 60 will generate the command "PC_ON_NG", as a mounting disable message for prohibiting iSCSI mounting onto the host computer system 30 (Step S6250). Subsequently, the storage management system 60 sends the generated command "PC_ON_NG" to the host computer system 30, by way of the mounting enabled/disabled response (Step S6270).

B2. Unmounting Operation

Figure 15:
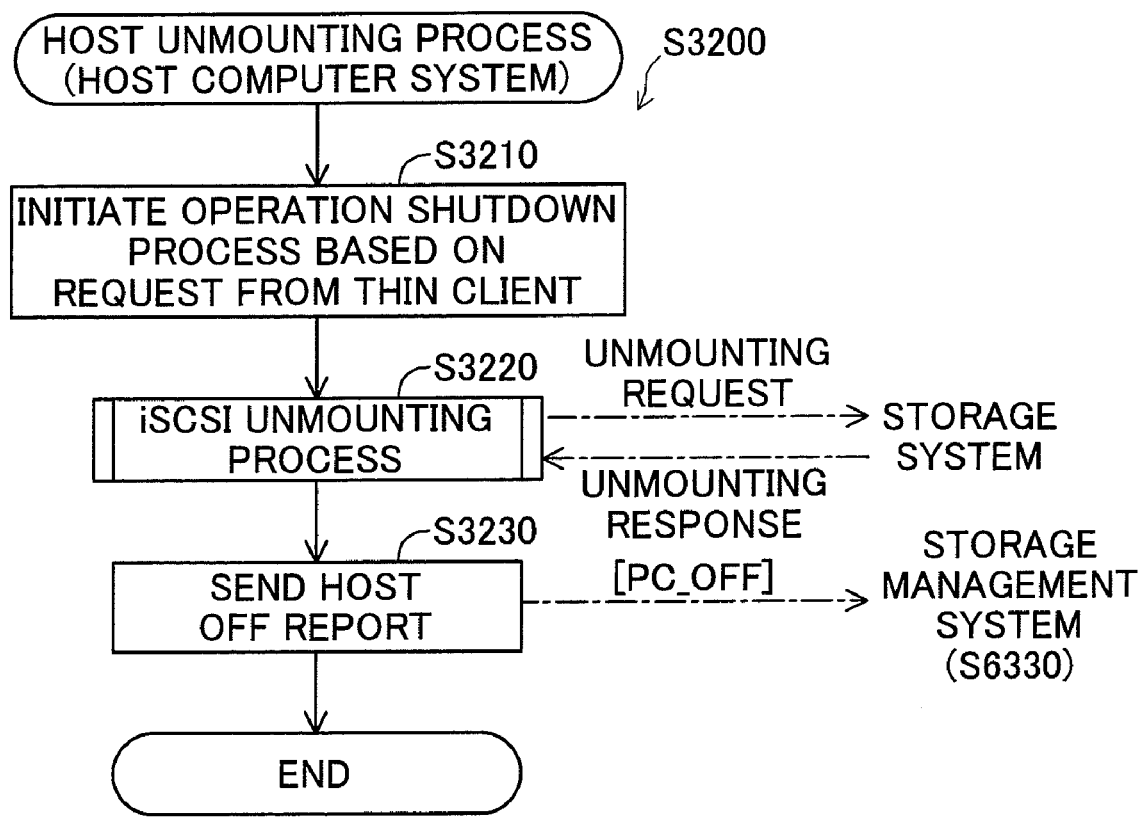
FIG. 15 is a flowchart depicting the host unmounting process (Step S3200) executed by the host computer system 30 in the computer system 10.

FIG. 15 is a flowchart depicting the host unmounting process (Step S3200) executed by the host computer system 30 in the computer system 10. The host unmounting process (Step S3200) of FIG. 15 includes a process for shutting down operation of the host computer system 30 as the server of the thin client system, based on a request from the thin client 20. In the embodiment, the host unmounting process (Step S3200) of FIG. 15 is accomplished by operation of the CPU 310 of the host computer system 30 on the basis of software. In the embodiment, the CPU 310 of the host computer system 30 initiates the host unmounting process (Step S3200) of FIG. 15 when it has received a request to terminate processing (shutdown) from the thin client 20.

When the host unmounting process (Step S3200) of FIG. 15 is initiated, the host computer system 30 of the computer system 10 initiates an operation shutdown process to shutdown operation as the server for the thin client system, on the basis of a request from the thin client 20 (Step S3210). Subsequently, the host computer system 30 executes an iSCSI unmounting process for unmounting the currently iSCSI-mounted LU 590 of the storage system 50 (Step S3220). In the embodiment, in the iSCSI unmounting process (Step S3220), after the unmounting request is sent from the host computer system 30 which is the iSCSI initiator to the LU 590 of the storage system 50 which is the iSCSI target, an Unmounting response is sent back from the storage system 50 to the host computer system 30, whereby unmounting of the LU 590 is executed by the host computer system 30. After the iSCSI unmounting process has been executed (Step S3220), the host computer system 30 sends the storage management system 60 a Host Off report "PC_OFF" indicating that the host computer system 30 has shut down operation as the server of the thin client system (Step S3230). In the embodiment, the Host On report "PC_ON" is included in the IPMI command sent from the host computer system 30 to the storage management system 60.

Figure 16:
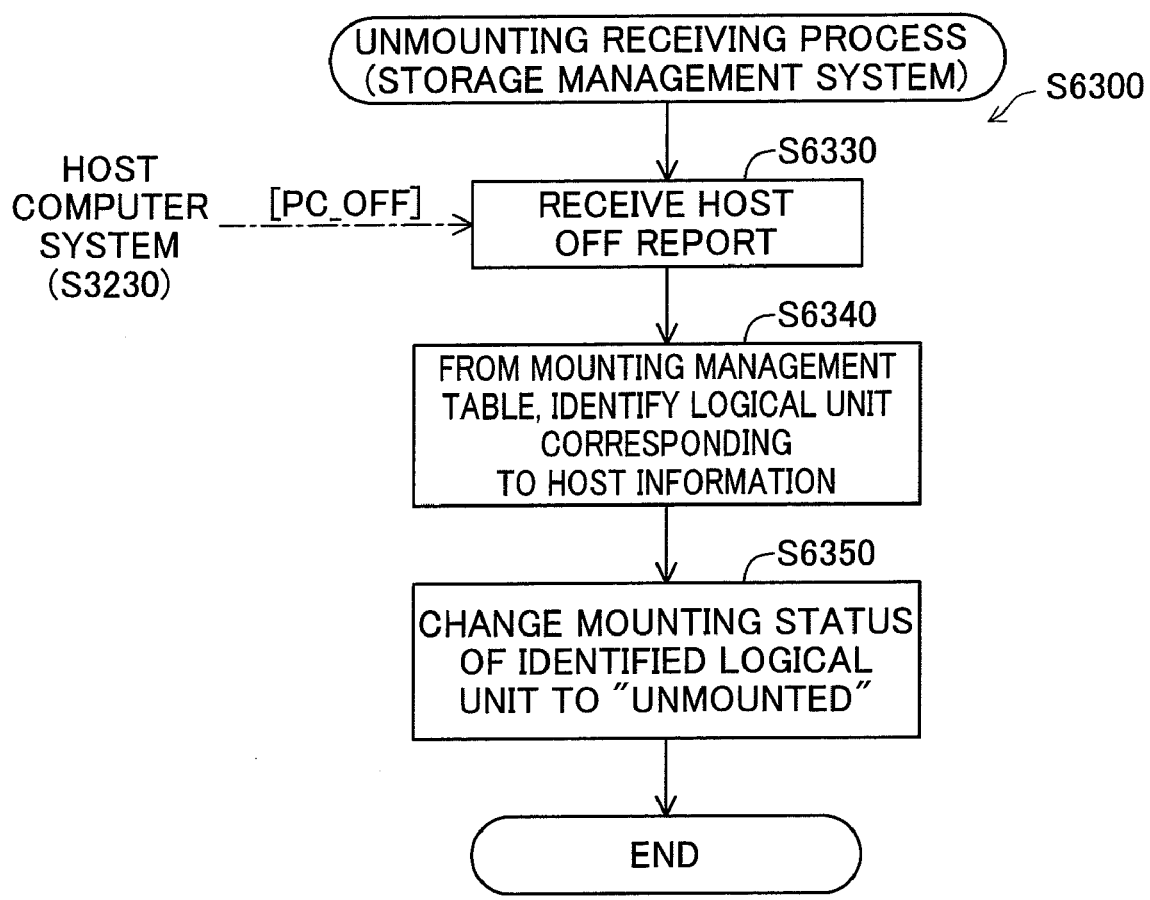
FIG. 16 is a flowchart depicting the unmounting reception process (Step S6300) executed by the storage management system 60 in the computer system 10.

FIG. 16 is a flowchart depicting the unmounting reception process (Step S6300) executed by the storage management system 60 in the computer system 10. The unmounting reception process (Step S6300) of FIG. 16 includes a process for detecting unmounting by the host computer system 30. In the embodiment, the unmounting reception process (Step S6300) of FIG. 16 is accomplished by operation of the CPU 610 of the storage management system 60 based on software. In the embodiment, the CPU 610 of the storage management system 60 initiates the unmounting reception process of FIG. 16 (Step S6300), in the event that a Host Off report "PC_OFF" is sent to the storage management system 60 by the host computer system 30 (Step S3230 of FIG. 15).

When the unmounting reception process (Step S6300) of FIG. 16 is initiated, the storage management system 60 of the computer system 10 receives the Host Off report "PC_OFF" from the host computer system 30 (Step S6330). Subsequently, the storage management system 60 looks up and identifies from the mounting management table 692 the logical unit identification number corresponding to the host information included in the Host Off report "PC_OFF" (Step S6340). Subsequently, the storage management system 60 changes the mounting information recorded in the table column 6928 of the mounting management table 692 that indicates the mounting mode of the logical unit identification number identified by the Host Off report "PC_OFF", from "Host Mounted" to "Unmounted" (Step S6350).

B3. Maintenance Operation

Figure 17:
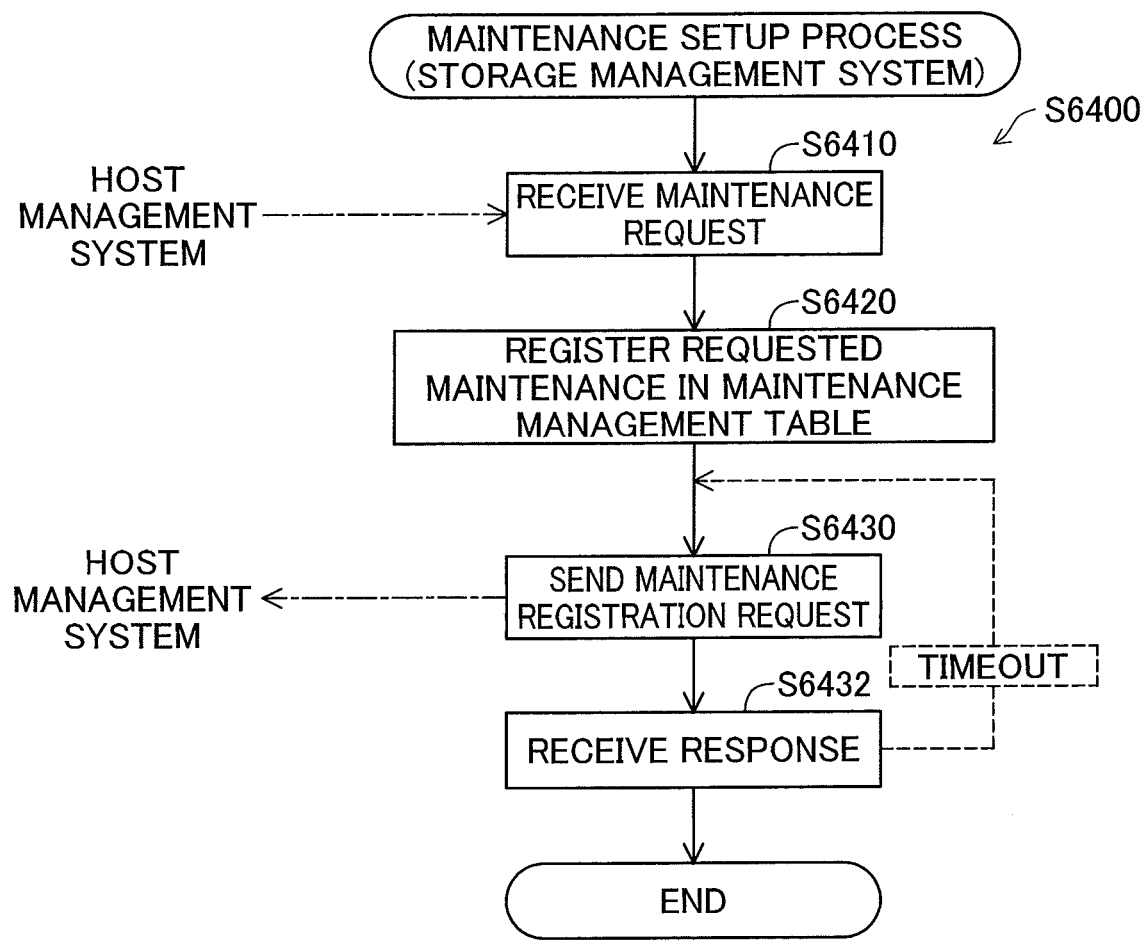
FIG. 17 is a flowchart depicting the maintenance setup process (Step S6400) executed by the storage management system 60 in the computer system 10.

FIG. 17 is a flowchart depicting the maintenance setup process (Step S6400) executed by the storage management system 60 in the computer system 10. The maintenance setup process (Step S6400) of FIG. 17 includes a process for setting up a new maintenance schedule in the maintenance management table 694 of the storage management system 60. In the embodiment, maintenance setup process (Step S6400) of FIG. 17 is accomplished by operation of the CPU 610 of the storage management system 60 on the basis of software. In the embodiment, the CPU 610 of the storage management system 60 initiates the maintenance setup process (Step S6400) of FIG. 17 in the event that a maintenance request to register a new maintenance item is received from a maintenance requestor (e.g. the host management system 40 or the host computer system 30).

When the maintenance setup process (Step S6400) of FIG. 17 is initiated, the storage management system 60 of the computer system 10 receives the maintenance request from the maintenance requestor (Step S6410). Subsequently, on the basis of information included in the maintenance request, the storage management system 60 registers the new maintenance item in the maintenance management table 694 (Step S6420). Subsequently, the storage management system 60 sends the maintenance requestor a maintenance registration report indicating that the new maintenance item has been registered in the maintenance management table 694, on the basis of the maintenance request received from the host management system 40 (Step S6430). In the embodiment, in the event of a timeout, i.e. where a timeout interval (e.g. of 10 seconds) has elapsed without receiving a response to the maintenance registration report from the host management system 40, the storage management system 60 again transmits the maintenance registration report to the maintenance requestor (Step S6432).

Figure 18:
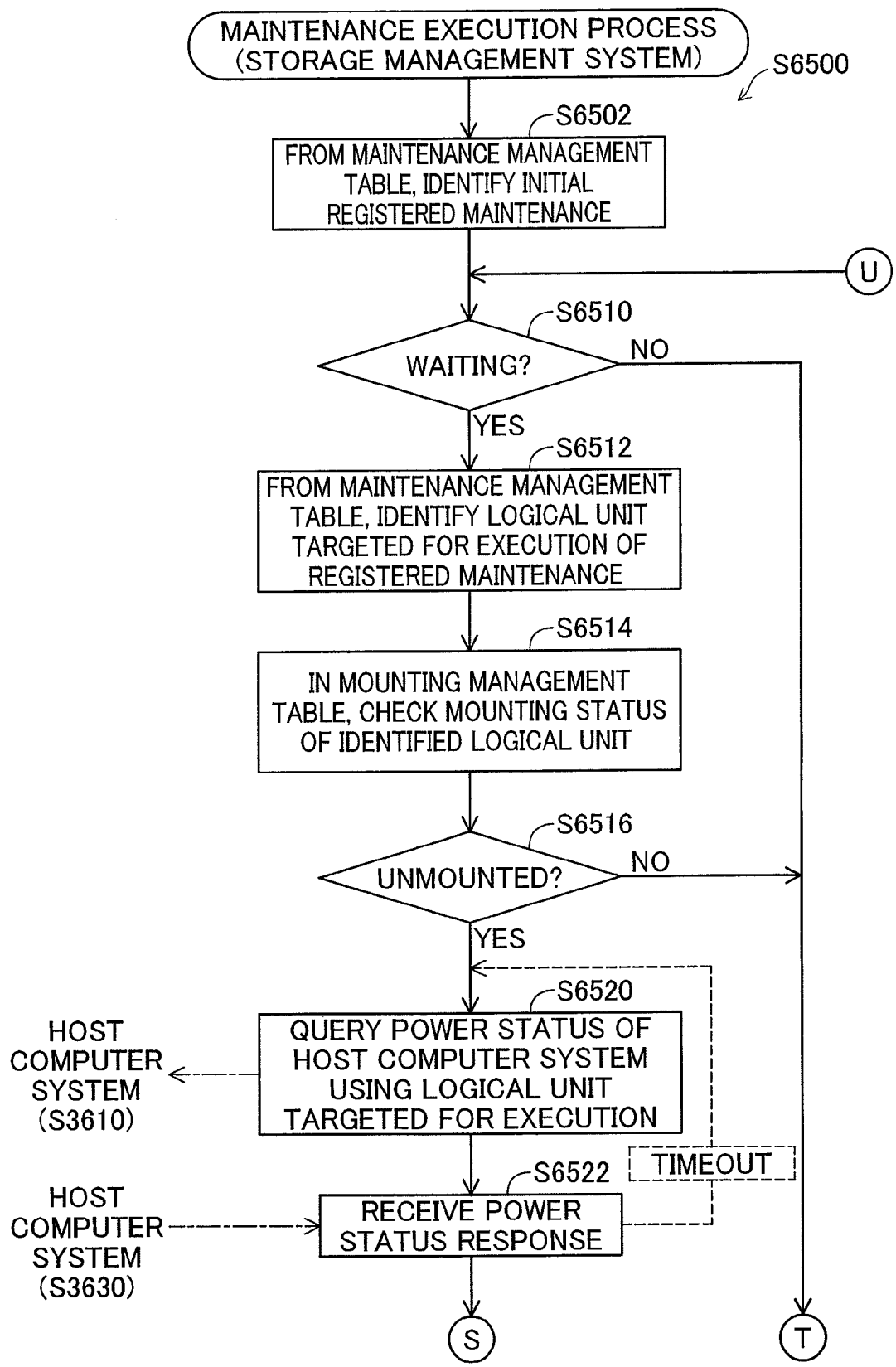
FIG. 18 is a flowchart depicting the maintenance execution process (Step S6500) executed by the storage management system 60 in the computer system 10.
Figure 19:
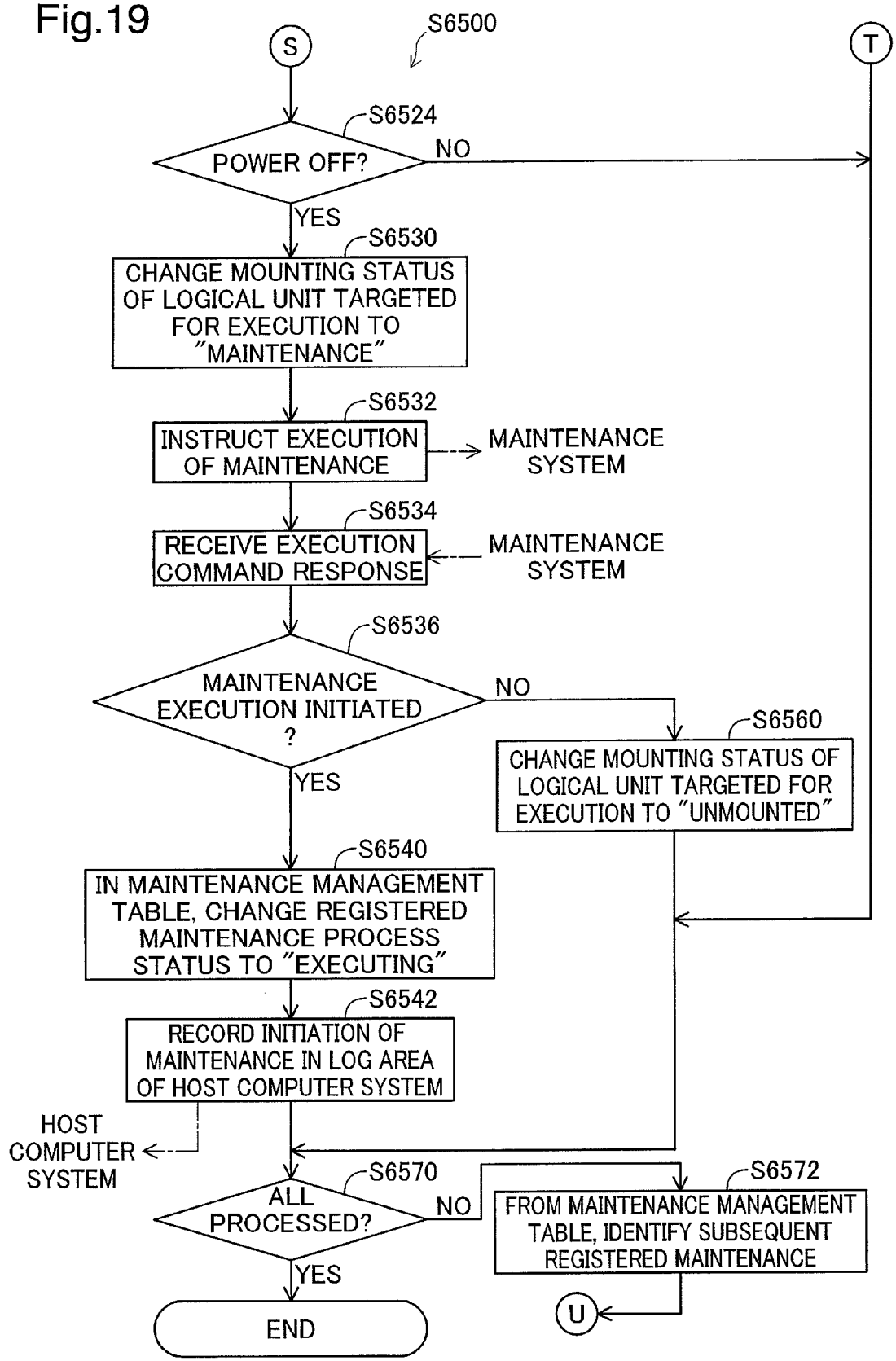
FIG. 19 is a flowchart depicting the maintenance execution process (Step S6500) executed by the storage management system 60 in the computer system 10.

FIG. 18 and FIG. 19 are flowcharts depicting the maintenance execution process (Step S6500) executed by the storage management system 60 in the computer system 10. The maintenance execution process (Step S6500) of FIGS. 18 and 19 includes a process for causing the maintenance system 70 to execute maintenance items set up in the maintenance management table 694 of the storage management system 60. In the embodiment, the maintenance execution process (Step S6500) of FIGS. 18 and 19 is accomplished by operation of the CPU 610 of the storage management system 60 on the basis of software. In the embodiment, the CPU 610 of the storage management system 60 executes periodically the maintenance execution process (Step S6500) of FIGS. 18 and 19.

When the storage management system 60 of the computer system 10 initiates the maintenance execution process (Step S6500) of FIGS. 18 and 19, an initial registered maintenance item that has been registered in the maintenance management table 694 is identified (Step S6502). In the embodiment, the initially identified registered maintenance item is determined on the basis of the sequence of maintenance registration numbers recorded in the table column 6941 of the maintenance management table 694. In the embodiment, in the maintenance execution process (Step S6500) of FIGS. 18 and 19, after the process has been completed for the initial registered maintenance item, the process is performed in succession for subsequent registered maintenance items, according to the maintenance registration number sequence (Steps S6570, S6572).

After a registered maintenance item has been identified from the maintenance management table 694 (Step S6502), the storage management system 60 looks up in the table column 6948 of the maintenance management table 694 to check that the status information of the registered maintenance item indicates "Waiting" status (Step S6510). Subsequently, the storage management system 60, through lookup by the logical unit identification number in the table column 6942 of the maintenance management table 694, identifies the LU 590 of the storage system 50 targeted for execution of the registered maintenance (Step S6512). Subsequently, the storage management system 60, through lookup in the table column 6928 of the mounting management table 692, checks that the mounting status of the LU 590 of the storage system 50 identified by the logical unit identification number has "Unmounted" status (Step S6516).

Subsequently, the storage management system 60, using an IPMI command, queries the power management controller 360 of the host computer system 30 as to the power status of the host computer system 30 to which has been assigned the LU 590 of the storage system 50 currently targeted for execution of registered maintenance (Step S6520). In the embodiment, prior to addressing the query to the power management controller 360 of the host computer system 30, the storage management system 60 queries the host management system 40 as to which the host computer system 30 the LU 590 of the storage system 50 targeted for execution of the registered maintenance has been assigned; however, as an alternative embodiment, the storage management system 60 could instead query the power status of the host computer system 30 via the host management system 40. In the embodiment, in the event of a timeout, i.e. where a timeout interval (e.g. of 10 seconds) has elapsed without receiving a response to the power status query from the host computer system 30, the storage management system 60 again transmits the power status query to the host computer system 30 (Step S6522).

After receiving a response that includes power information indicating the power status of the host computer system 30 (Step S6522), the storage management system 60, on the basis of the response from the host computer system 30, verifies that the power of the host computer system 30 is Off (Step S6524). Subsequently, the storage management system 60 changes the mounting information recorded in the table column 6928 of the mounting management table 692 from "Unmounted" to "Maintenance" (Step S6530).

The storage management system 60 subsequently instructs the maintenance system 70 to execute the registered maintenance item (Step S6532). The storage management system 60 then verifies, based on a response from the maintenance system 70, that the registered maintenance item was begun (Steps S6534, S6536), and changes the status information in the table column 6948 of the maintenance management table 694 from "Waiting" to "Executing" (Step S6540).

Subsequently, the storage management system 60 sends the power management controller 360 of the host computer system 30 an IPMI command that includes maintenance information indicating that maintenance has begun (Step S6542). By so doing, in the host computer system 30, the maintenance information indicating that maintenance has begun is recorded in the form of an IPMI communications log in the log memory portion 362 of the power management controller 360. The maintenance information recorded in the log memory portion 362 of the host computer system 30 is utilized for lookup for the purpose of checking the process status of the maintenance (Step S3154 of FIG. 11) during the host mounting process of the host computer system 30 (Step S3100).

Returning to the discussion of FIGS. 18 and 19, after the maintenance information has been recorded in the log memory portion 362 of the host computer system 30 (Step S6542), the storage management system 60 performs processing for the subsequent registered maintenance items, in the same manner as for the initial registered maintenance item, until processing has been completed for all registered maintenance items (Steps S6570, 6572).

On the other hand, if after instructing the maintenance system 70 to execute a registered maintenance item (Step S6532) the storage management system 60 verifies, based on a response from the maintenance system 70, that the registered maintenance item was not begun (Steps S6534, S6536), it cancels execution of the registered maintenance item and changes the status information in the table column 6928 of the mounting management table 692 from "Maintenance" to "Unmounted" (Step S6560). The storage management system 60 subsequently performs processing for the subsequent registered maintenance items, in the same manner as for the initial registered maintenance item, until processing has been completed for all registered maintenance items (Steps S6570, 6572).

In the event that the status information of the registered maintenance is not "Waiting" (Step S6510), that the mounting status of the LU 590 of the storage system 50 identified by the logical unit identification number is not "Unmounted" (Step S6516), or that the power information included in the response from the host computer system 30 does not indicate "Power On" (Step S6524), the storage management system 60 cancels execution of the registered maintenance item, and performs processing for the subsequent registered maintenance items, in the same manner as for the initial registered maintenance item, until processing has been completed for all registered maintenance items (Steps S6570, 6572).

Figure 20:
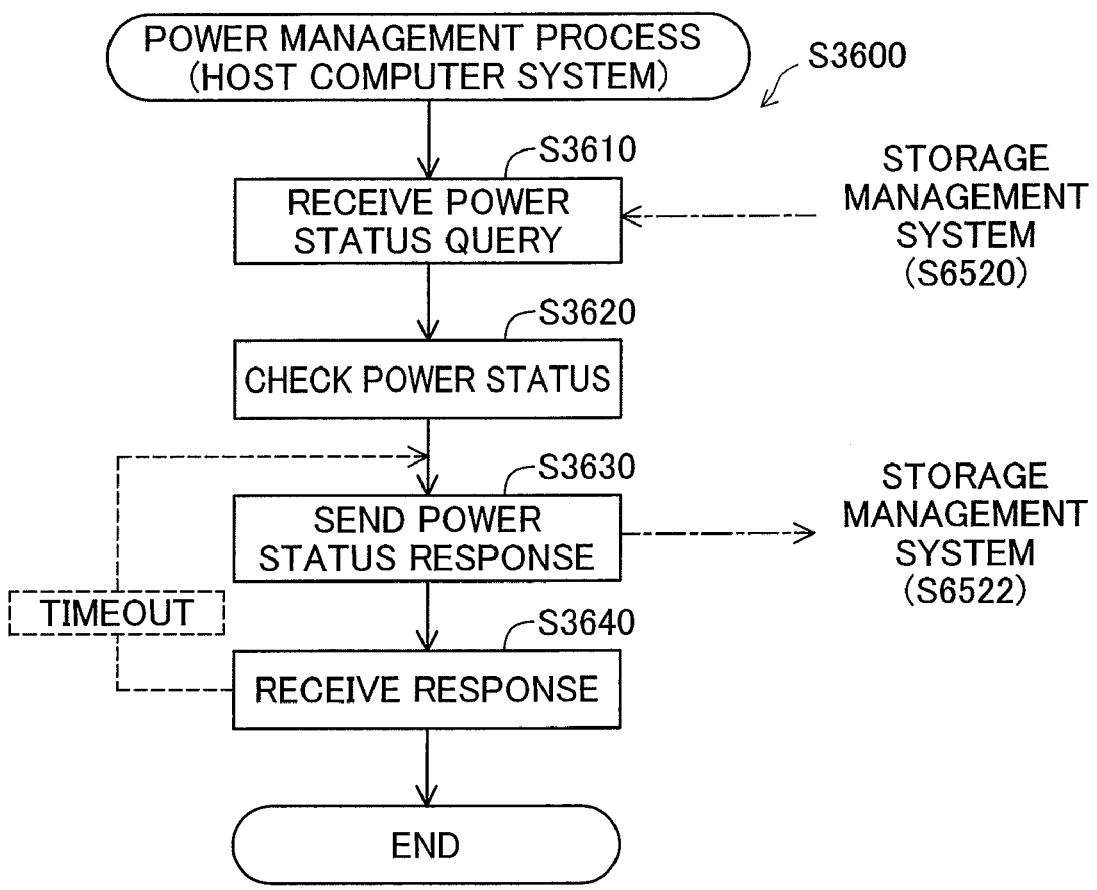
FIG. 20 is a flowchart depicting the power management process (Step S3600) executed by the host computer system 30 in the computer system 10.

FIG. 20 is a flowchart depicting the power management process (Step S3600) executed by the host computer system 30 in the computer system 10. The power management process (Step S3600) of FIG. 20 includes a process whereby the host computer system 30 reports the storage management system 60 of the power status of the host computer system 30. In the embodiment, the power management process (Step S3600) of FIG. 20 is accomplished through operation of the power management controller 360 of the host computer system 30, based on the IPMI firmware. In the embodiment, the power management controller 360 of the host computer system 30 initiates the power management process (Step S3600) of FIG. 20 on the basis of an IPMI command from the storage management system 60.

When the power management process (Step S3600) of FIG. 20 is initiated, the host computer system 30 of the computer system 10 receives from the storage management system 60 the IPMI command for querying the power status of the host computer system 30 (Step S3610). Subsequently, when the host computer system 30 checks the power status in the host computer system 30 (Step S3620), it sends the storage management system 60 a power status response in the form of an IPMI command that includes power information indicating the power status of the host computer system 30 (Step S3630). In the embodiment, in the event of a timeout, i.e. where a timeout interval (e.g. of 10 seconds) has elapsed without receiving a response to the power status response from the storage management system 60, the host computer system 30 again transmits the power status response to the storage management system 60 (Step S3640).

Figure 21:
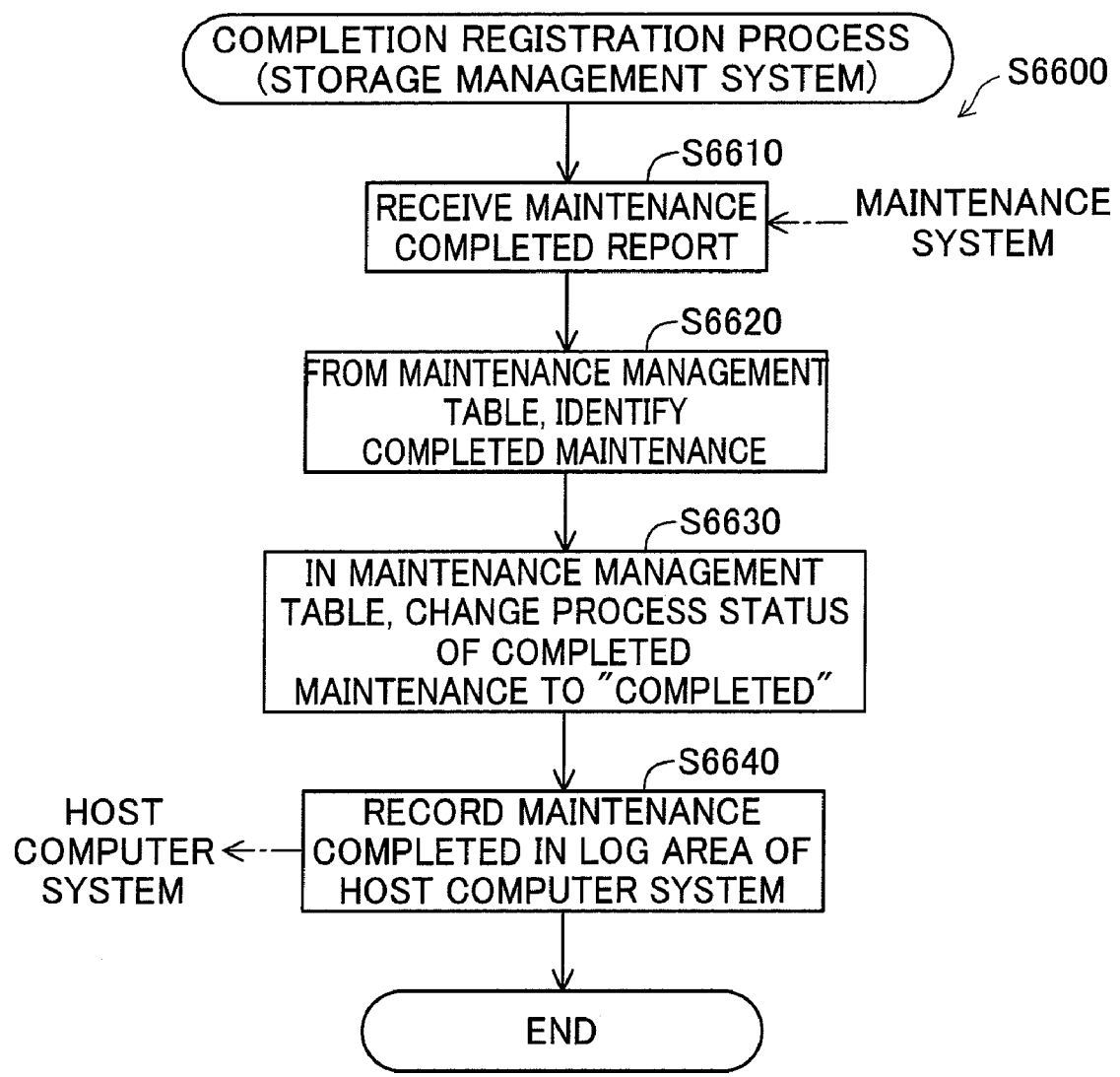
FIG. 21 is a flowchart depicting the completion registration process (Step S6600) executed by the storage management system 60 in the computer system 10.

FIG. 21 is a flowchart depicting the completion registration process (Step S6600) executed by the storage management system 60 in the computer system 10. The completion registration process (Step S6600) of FIG. 21 includes a process for registering completion of maintenance, in the maintenance management table 694. In the embodiment, the completion registration process (Step S6600) of FIG. 21 is accomplished through operation of the CPU 610 of the storage management system 60, based on software. In the embodiment, the CPU 610 of the storage management system 60 initiates the completion registration process (Step S6600) of FIG. 21 on the basis of an report from the maintenance system 70.

When the completion registration process (Step S6600) of FIG. 21 is initiated, the storage management system 60 of the computer system 10 receives from the maintenance system 70 a Maintenance Completed report indicating completion of the maintenance item that was assigned to the maintenance system 70 by the storage management system 60 (Step S6610); subsequently, the storage management system 60 identifies the completed maintenance item from the maintenance management table 694, on the basis of the Maintenance Completed report (Step S6620). Subsequently, the storage management system 60 changes the status information recorded in the table column 6948 of the maintenance management table 694 from "Executing" to "Completed" (Step S6630).

The storage management system 60 subsequently sends the power management controller 360 of the host computer system 30 an IPMI command that includes maintenance information indicating that maintenance is completed (Step S6640). By so doing, in the host computer system 30, maintenance information indicating completion of maintenance is recorded in log memory portion 362 of the power management controller 360, in the form of an IPMI communications log. The maintenance information recorded to the log memory portion 362 of the host computer system 30 is used for lookup in order to check the maintenance process status (Step S3154 of FIG. 11) in the host mounting process of the host computer system 30 (Step S3100).

Figure 22:
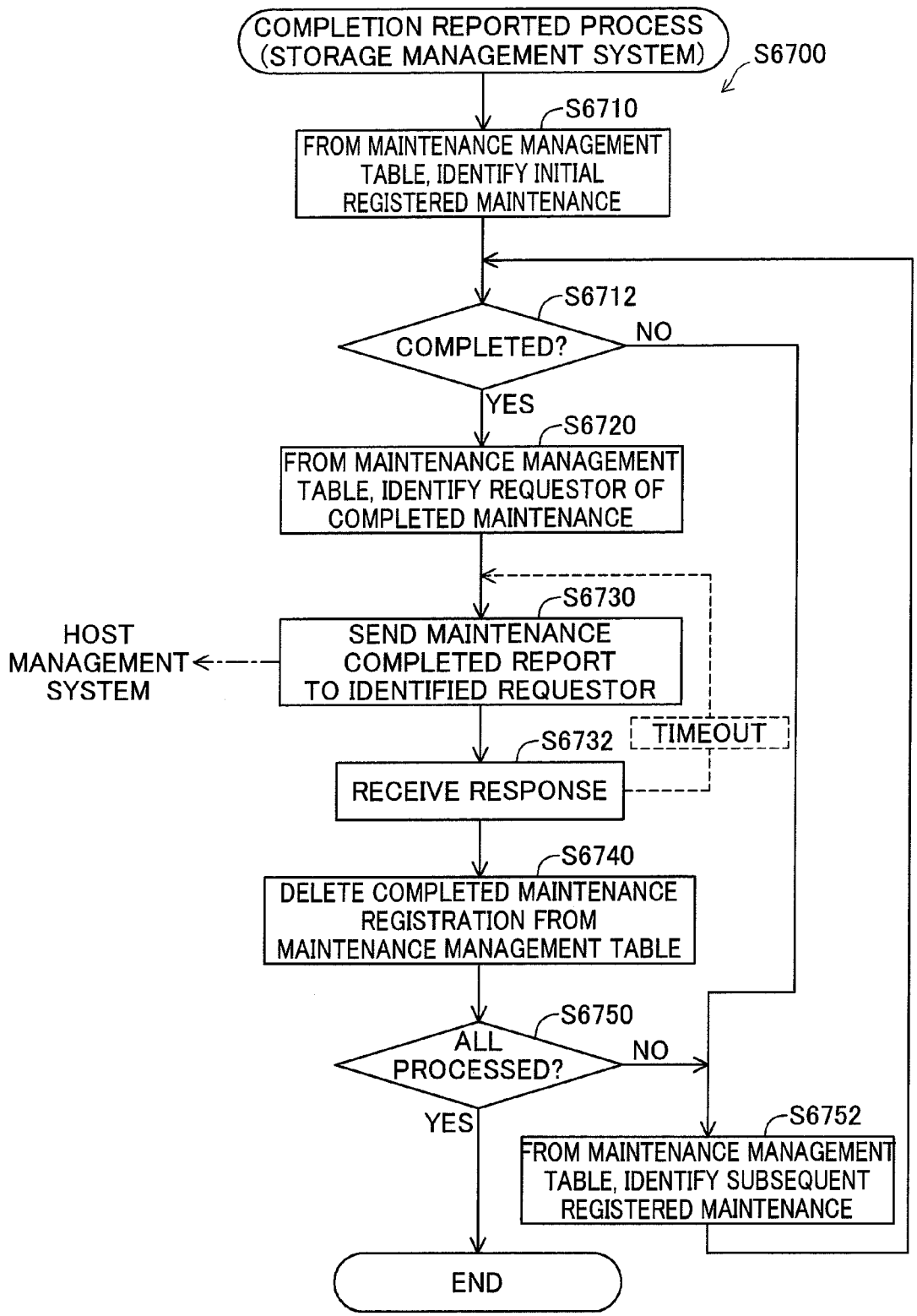
FIG. 22 is a flowchart depicting the completion reported process (Step S6700) executed by the storage management system 60 in the computer system 10.

FIG. 22 is a flowchart depicting the completion reported process (Step S6700) executed by the storage management system 60 in the computer system 10. The completion reported process (Step S6700) of FIG. 22 includes a reported process that the maintenance item was completed to the requestor of a maintenance item. In the embodiment, the completion reported process (Step S6700) of FIG. 22 is accomplished through operation of the CPU 610 of the storage management system 60, based on software. The CPU 610 of the storage management system 60 periodically executes the completion reported process (Step S6700) of FIG. 22.

When the completion reported process (Step S6700) of FIG. 22 is initiated, the storage management system 60 of the computer system 10 identifies an initial registered maintenance item that has been registered in the maintenance management table 694 (Step S6710). In the embodiment, the initially identified registered maintenance item is determined on the basis of the sequence of maintenance registration numbers recorded in the table column 6941 of the maintenance management table 694. In the embodiment, in the completion reported process (Step S6700) of FIG. 22, after the process has been completed for the initial registered maintenance item, the process is initiated in succession for subsequent registered maintenance items, according to the maintenance registration number sequence (Steps S6570, S6572).

After the registered maintenance item has been identified from the maintenance management table 694 (Step S6710), the storage management system 60 looks up in the table column 6948 of the maintenance management table 694 and checks that the status information of the registered maintenance indicates "Completed" status (Step S6510). Subsequently, the storage management system 60 looks up in the table column 6946 of the maintenance management table 694 to check the completed maintenance requester information (Step S6720).

Subsequently, based on the requester information identified in the maintenance management table 694, the storage management system 60 sends the maintenance requester who requested the completed maintenance (e.g. the host management system 40) a Maintenance Completed report indicating that the maintenance was completed (Step S6730). In the embodiment, in the event of a timeout, i.e. where a timeout interval (e.g. of 10 seconds) has elapsed without receiving a response to the Maintenance Completed report from the maintenance requester, the storage management system 60 again transmits the Maintenance Completed report to the maintenance requestor (Step S6732). After a response has been received from the maintenance requester (Step S6732), the storage management system 60 deletes the registered maintenance item from the maintenance management table 694 (Step S6740).

According to the computer system 10 discussed above, maintenance of the LU 590 of the storage system 50 is executed at times when the host computer system 30 is not currently mounting the LU 590, while mounting by the host computer system 30 is executed at times when maintenance is not currently being performed. As a result, it is possible to prevent mounting of the LU 590 by the host computer system 30 and maintenance of the LU 590 from being carried out simultaneously.

Furthermore, since the storage management system 60 detects booting of the host computer system 30 on the basis of a Host On report "PC_ON" sent from the host computer system 30 (Step S6202), the storage management system 60 can detect booting of the host computer system 30, without the need to query the host computer system 30.

Moreover, since the storage management system 60 detects shutdown of operation of the host computer system 30 on the basis of a Host Off report "PC_OFF" sent from the host computer system 30 (Step S6330), the storage management system 60 can detect shutdown of operation of the host computer system 30, without the need to query the host computer system 30. Furthermore, since the storage management system 60 decides whether the host computer system 30 is currently mounting the LU 590 of the storage system 50 is made based on the Host On report "PC_ON" and Host Off report "PC_OFF" sent from the host computer system 30 (Steps S6200, S6300, and Step S6516), the storage management system 60 can decide whether mounting is currently in progress, without the need to query the host computer system 30.

Moreover, since the Host On report "PC_ON" and the Host Off report "PC_OFF" are includes in IPMI commands exchanged between the power management controller 360 of the host computer system 30 and the storage management system 60, the storage management system 60 can acquire the Host On report "PC_ON" and the Host Off report "PC_OFF" from the host computer system 30, in a manner independent of the architecture of the host computer system 30.

Furthermore, since the storage management system 60 decides mounting of the host computer system 30 based on power information that is included in IMPI commands acquired from the host computer system 30 (Steps S6520, S6522, S6524, S6530), the storage management system 60 can decide whether the host computer system 30 is currently mounting the LU 590 of the storage system 50 in a manner independent of the architecture of the host computer system 30, on the basis of the On/Off status of the power supply of the host computer system 30.

Moreover, since in the event that the LU 590 of the storage system 50 is currently being mounted by the host computer system 30, the storage management system 60 will delay maintenance on the LU 590 until at least the point in time that mounting is completed (Step S5600), maintenance not performed due to mounting by the host computer system 30 can be executed after unmounting by the host computer system 30.

Furthermore, since in the event that the LU 590 of the storage system 50 is currently undergoing maintenance, the storage management system 60 will disable mounting by the host computer system 30 (Step S6250), it is possible to prevent the LU 590 of the storage system 50 from being mounted by the host computer system 30 during maintenance. Also, since the storage management system 60 enables the host computer system 30 to carry out mounting, by means of interrupting a particular maintenance item currently in progress depending on the priority established for the maintenance item in the maintenance priority table 696 (Step S6224), it is possible to prevent the LU 590 currently undergoing maintenance from being mounted by the host computer system 30, while enabling mounting by the host computer system 30 while maintenance is in progress, depending on the priority thereof. Furthermore, since the maintenance priority table 696 indicates maintenance priority assigned for each type of maintenance item, priority of mounting vis-à-vis maintenance can be assigned for each type of maintenance item, in consideration of the effect that interruption of maintenance would have on the LU 590 of the storage system 50.

C. Other Embodiments

While the invention has been described herein in terms of a certain preferred embodiment, the invention is in no wise limited to the embodiment set forth herein, and may be reduced to practice in various other forms without departing from the spirit thereof. For example, whereas in the embodiment, the host management system 40, the storage system 50, the storage management system 60, and the maintenance system 70 in the computer system 10 are constituted as separate individual systems, in alternative embodiments, the host management system 40 and the storage system 50 could be constituted as an integrated system, the storage management system 60 and the maintenance system 70 could be constituted as an integrated system, or the storage system 50 and the maintenance system 70 could be constituted as an integrated system.

The storage management system described above may assume the following embodiments. For example, the Host On detecting portion may include an On report receiving portion for receiving a Host On report transmitted by the host computer system when the host computer system boots; and an On report detecting portion for detecting booting of the host computer system, on the basis of the Host On report received by the On report receiving portion. With this arrangement, the storage management system will be able to detect booting of the host computer system without the need to query the host computer system.

It is also acceptable for the Host On report received by the On report receiving portion to include information for exchange with the host computer system in accordance with IPMI (Intelligent Platform Management Interface) specifications. With this arrangement, the storage management system will be able to acquire the Host On report from the host computer system, in a manner independent of the architecture of the host computer system.

The storage management system may further comprise a Host Off detecting portion for detecting shutdown of operation by the host computer system, and the mounting decision portion may include an access detection and decision portion for deciding whether the host computer system is currently mounting the storage area in the storage system, on the basis of detection of booting of the host computer system by the Host On detecting portion and detection of shutdown of operation of the host computer system by the Host Off detecting portion. With this arrangement, the storage management system will be able to decide whether the host computer system is currently mounting the storage area of the storage system, without the need to query the host computer system.

The Host Off detecting portion may include an Off report receiving portion for receiving a Host Off report transmitted by the host computer system when the host computer system shuts down operation; and an Off report detecting portion for detecting shutdown of operation by the host computer system, on the basis of the Host Off report received by the Off report receiving portion. With this arrangement, the storage management system will be able to detect shutdown of operation by the host computer system, without the need to query the host computer system.

The Host Off report received by the Off report receiving portion may include information for exchange with the host computer system in accordance with IPMI specifications. By so doing, the storage management system will be able to acquire the Host Off report from the host computer system, in a manner independent of the architecture of the host computer system.

The storage management system may further comprise a power information acquiring portion for acquiring power information indicating On/Off status of the power supply which powers the host computer system, this information being acquired from the host computer system in accordance with IPMI specifications; and the mounting decision portion may include a power information decision portion for deciding whether the host computer system is currently mounting the storage area in the storage system, on the basis of power information acquired by the power information acquiring portion. With this arrangement, the storage management system will be able to decide, on the basis of the On/Off status of the power supply, whether the host computer system is currently mounting the storage area in the storage system, in a manner independent of the architecture of the host computer system.

The storage management system may further comprise a maintenance information transmitting portion for transmitting to the host computer system, in accordance with IPMI specifications, maintenance information indicating the status of execution of maintenance of the storage area in the storage system by the maintenance system. With this arrangement, the storage management system will be able to transmit maintenance information to the host computer system, in a manner independent of the architecture of the host computer system. As a result, the host computer system will be able to decide maintenance execution information for the storage area of the storage system, by means of checking maintenance information in accordance with IPMI specifications that has been saved to the communications log.

The storage management system may further comprise a maintenance delaying portion that, in the event of a decision by the mounting decision portion that the host computer system is currently mounting the storage area, delays execution of the scheduled maintenance, at least until completion of mounting. With this arrangement, maintenance that was not performed due to mounting by the host computer system can instead be performed subsequent to unmounting by the host computer system.

The storage management system may further comprise a mounting disabling portion that, in the event of a decision by the maintenance decision portion that the maintenance system is currently performing maintenance of the storage area, disables mounting of the storage area in the storage system by the host computer system. With this arrangement, in the event that the host computer system is booted while a maintenance item is being performed, the host computer system can be prevented from mounting the storage area during this maintenance item.

The storage management system may further comprise a maintenance interrupt command portion that, in the event of a decision by the maintenance decision portion that the maintenance system is currently performing maintenance of the storage area, generates a command to interrupt the maintenance currently being executed by the maintenance system; and an interrupt mounting enabling portion that, in the event of interruption in accordance with the maintenance interrupt command portion of maintenance currently being executed by the maintenance system, enables the host computer system to mount the storage area in the storage system. With this arrangement, it is possible to prevent the host computer system from mounting a storage area that is undergoing maintenance in the event that the host computer system is booted during maintenance, while still implementing mounting by means of the host computer system.

The storage management system may further comprise a priority management portion for managing a priority table assigning priority to mounting by the host computer system vis-à-vis maintenance by the maintenance system; a priority decision portion that, in the event of a decision by the maintenance decision portion that the maintenance system is currently performing maintenance of the storage area, makes a decision on the basis of the priority table as to the priority of the maintenance currently being executed vis-à-vis mounting by the host computer system; a maintenance interrupt command portion that, in the event of a decision by the priority decision portion that the maintenance currently being executed is of lower priority vis-à-vis mounting by the host computer system, generates a command to interrupt the maintenance currently being executed by the maintenance system; an interrupt mounting enabling portion that, in the event of interruption of the maintenance currently being executed by the maintenance system in accordance with the maintenance interrupt command portion, enables the host computer system to mount the storage area in the storage system; and a mounting disabling portion that, in the event of a decision by the priority decision portion that the priority decision portion that the maintenance currently being executed is of higher priority vis-à-vis mounting by the host computer system, disables mounting of the storage area in the storage system by the host computer system.

The priority table may include information assigning priority vis-à-vis mounting by the host computer system, for each type of maintenance performed by the maintenance system. By so doing, priority of mounting vis-à-vis maintenance can be assigned for each type of maintenance item, in consideration of the effect that interruption of maintenance would have on the storage area of the storage system. For example, the maintenance tasks performed by the maintenance system could include at least one of the tasks of: memory expansion, initialization, backup, virus scanning, software installation, and software upgrades.

Mounting by the host computer system may be executed in accordance with iSCSI (Internet Small Computer System Interface) specifications and/or Fibre Channel specifications. In this way, even in cases where the file system of the host computer system cannot recognize maintenance in the storage system, it will be possible to prevent the storage management system from simultaneously carrying out mounting of the storage area by the host computer system and maintenance of the storage area by the storage system.

The computer system described above may assume the following embodiments. For example, the host computer system may include a power management portion for managing, in accordance with IPMI specifications, power information indicating On/Off status of the power supply which powers the host computer system; the system may further comprise a power information acquiring portion for acquiring the power information from the power management portion of the host computer system, in accordance with IPMI specifications; and the mounting decision portion may decide, on the basis of the power information acquired by the power information acquiring portion, whether the host computer system is currently mounting the storage area in the storage system. With this arrangement, it is possible to decide, on the basis of the On/Off status of the host computer system power supply, whether the host computer system is currently mounting the storage area of the storage system, in a manner independent of the architecture of the host computer system.

The computer system may further comprise a maintenance information transmitting portion for transmitting to the host computer system, in accordance with IPMI specifications, maintenance information indicating the status of execution of maintenance of the storage area in the storage system by the maintenance system; and the host computer system may include: a log memory portion for saving, in the form of a communications log in accordance with IPMI specifications, maintenance information that has been transmitted by the maintenance information transmitting portion; a log decision portion that, in the event a communications malfunction with the mounting enabling portion has occurred, decides the status of execution of maintenance by the maintenance system based on maintenance information that has been saved in the communications log; and a mounting execution portion that mounts the storage area in the storage system, in the event that the log decision portion decides that the maintenance system is not currently performing maintenance of the storage area. By means of this arrangement, even in the event a communications malfunction (e.g. the mounting enabling portion is down, a failure on the network, etc.) has occurred between the host computer system and the mounting enabling portion, the host computer system, on the basis maintenance information recorded into a communications log in accordance with IPMI specifications, will be able to mount the storage area of the storage system while avoiding times when maintenance is currently being performed.

The computer system may further comprise a client for implementing data processing in cooperation with the host computer system; and booting of the host computer system may be executed based on a boot request from the client. In this way, even in instances where the host computer system must mount the storage area of the storage system at arbitrary timing in response to a request from the client, it is possible to prevent mounting of the storage area by the host computer system and maintenance on the storage area from being carried out simultaneously. Moreover, the client can be a thin client lacking the function of internally storing data other than prerecorded data.

Although the invention has been described and illustrated in detail, it is clearly understood that the same is by way of illustration and example only and is not to be taken by way of limitation, the spirit and scope of the invention being limited only by the terms of the appended claims.

What is claimed is:

1. A storage management system for managing, in a computer system, access to a storage area for storing data, the computer system includes: a storage system that provides the storage area; a host computer system that mounts the storage area of the storage system via a network; and
   a maintenance system that performs maintenance for the storage area of the storage system,
   the storage management system comprising:
   a mounting decision module that decides, according to a preestablished maintenance schedule, whether the host computer system is currently mounting the storage area of the storage system;
   a maintenance instruction module that instructs the maintenance system to execute the scheduled maintenance when the mounting decision module decides that the host computer system is not currently mounting the storage area;
   a host-on detecting module that detects a boot of the host computer system;
   a maintenance decision module that decides whether the maintenance system is currently performing the maintenance for the storage area when the host-on detecting module detects the boot of the host computer system; and
   a mounting enabling module that enables the host computer system to mount the storage area of the storage system when the maintenance decision module decides that the maintenance system is not currently performing the maintenance for the storage area.

2. The storage management system according to claim 1, wherein the host-on detecting module includes:
   an on-report receiving module that receives a host-on report from the host computer system when the host computer system is booted; and
   an on-report detecting module that detects the boot based on the host-on report received by the on-report receiving module.

3. The storage management system according to claim 2, wherein the host-on report includes data for communication with the host computer system in accordance with an IPMI protocol.

4. The storage management system according to claim 1, the storage management system further comprising a host-off detecting module that detects a shutdown of the host computer system,
   wherein the mounting decision module includes a decision module that decides, on the boot detected by the host-on detecting module and the shutdown detected by the host-off detecting module, whether the host computer system is currently mounting the storage area.

5. The storage management system according to claim 4, wherein the host-off detecting module includes:
   an off-report receiving module that receives a host-off report from the host computer system when the host computer system is shut down; and
   an off-report detecting module that detects the shutdown based on the host-off report received by the off-report receiving module.

6. The storage management system according to claim 5, wherein the host-off report includes data for communication with the host computer system in accordance with an IPMI protocol.

7. The storage management system according to claim 1, the storage management system further comprising a power information acquiring module that acquires power information from the host computer system in accordance with an IPMI protocol, wherein the power information represents an on/off state of power supply for host computer system,
wherein the mounting decision module includes a decision module that decides, on the power information acquired by the power information acquiring module, whether the host computer system is currently mounting the storage area.

8. The storage management system according to claim 1, the storage management system further comprising a maintenance information transmitting module that transmits maintenance information to the host computer system in accordance with an IPMI protocol, wherein the maintenance information represents a status of the maintenance for the storage area.

9. The storage management system according to claim 1, the storage management system further comprising a maintenance delaying module that, when the mounting decision module decides that the host computer system is currently mounting the storage area, delays execution of the scheduled maintenance at least until the host computer system unmounts the storage area.

10. The storage management system according to claims 1, the storage management system further comprising a mounting disabling module that, when the maintenance decision module decides the maintenance system is currently performing the maintenance for the storage area, disables the host computer system from mounting the storage area.

11. The storage management system according to claim 1, the storage management system further comprising:
a maintenance interrupt instruction module that, when the maintenance decision module decides the maintenance system is currently performing the maintenance for the storage area, instructs the maintenance system to interrupt the maintenance; and
an interrupt mounting enabling module that, when the maintenance system interrupts the maintenance according to the maintenance interrupt instruction module, enables the host computer system to mount the storage area.

12. The storage management system according to claim 1, the storage management system further comprising:
a priority management module that manages a priority table for assigning priority between the host computer system and the maintenance system;
a priority decision module that, when the maintenance decision module decides the maintenance system is currently performing the maintenance for the storage area, decides, according to the priority table, whether the host computer system has priority over the maintenance system;
a maintenance interrupt instruction module that, when the priority decision module decides that the host computer system has priority over the maintenance system, instructs the maintenance system to interrupt the maintenance;
an interrupt mounting enabling module that, when the maintenance system interrupts the maintenance according to the maintenance interrupt instruction module, enables the host computer system to mount the storage area; and
a mounting disabling module that, when the priority decision module decides that the maintenance system has priority over the host computer system, disables the host computer system from mounting the storage area.

13. The storage management system according to claim 12, wherein the priority table includes information representing, according to a type of maintenance performed by the maintenance system, the priority between the host computer system and the maintenance system.

14. The storage management system according to claim 1, wherein the maintenance performed by the maintenance system includes at least one of storage volume expansion, initialization, backup, virus scanning, software installation, and software upgrade.

15. The storage management system according to claims 1, wherein the mounting by the host computer system is executed in accordance with iSCSI protocol and/or Fibre Channel protocol.

16. A computer system including: a storage system that provides a storage area for storing data; a host computer system that mounts the storage area of the storage system via a network; and a maintenance system that performs maintenance for the storage area of the storage system,
the computer system comprising:
a mounting decision module that decides, according to a preestablished maintenance schedule, whether the host computer system is currently mounting the storage area of the storage system;
a maintenance instruction module that instructs the maintenance system to execute the scheduled maintenance when the mounting decision module decides that the host computer system is not currently mounting the storage area;
a host-on detecting module that detects a boot of the host computer system;
a maintenance decision module that decides whether the maintenance system is currently performing the maintenance for the storage area when the host-on detecting module detects the boot of the host computer system; and
a mounting enabling module that enables the host computer system to mount the storage area of the storage system when the maintenance decision module decides that the maintenance system is not currently performing the maintenance for the storage area.

17. The computer system according to claim 16,
wherein the host computer system comprises a power management module that manages power information in accordance with IPMI protocol, wherein the power information represents an on/off state of power supply for host computer system,
the computer system further comprising a power information acquiring module that acquires the power information from the power management module of the host computer system in accordance with the IPMI protocol,
wherein the mounting decision module includes a decision module that decides, on the power information acquired by the power information acquiring module, whether the host computer system is currently mounting the storage area.

18. The computer system according to claim 16,
the computer system further comprising a maintenance information transmitting module that transmits maintenance information to the host computer system in accordance with an IPMI protocol, wherein the maintenance information represents a status of the maintenance for the storage area, wherein the host computer system comprises:

a log memory module for storing, in a communication log in accordance with the IPMI protocol, the maintenance information transmitted from the maintenance information transmitting module;

a log decision module that, when a malfunction breaks out in communication between the host computer system and the mounting disabling module, decides the status of the maintenance based on the maintenance information stored in the log memory module; and a mounting execution module that mounts the storage area of the storage system when the log decision module decides that the maintenance system is not currently performing the maintenance for the storage area.

19. The computer system according to claims 16, the computer system further including a client that actualizes data processing in cooperation with the host computer system, wherein the boot of the host computer system is executed based on a boot request from the client.

20. A storage management method for a computer system, the computer system includes: a storage system that provides a storage area for storing data; a host computer system that mounts the storage area of the storage system via a network; a maintenance system that performs maintenance for the storage area of the storage system; and a storage management system that manages access to the storage area, the storage management method comprising:

deciding, by the storage management system, according to a preestablished maintenance schedule, whether the host computer system is currently mounting the storage area of the storage system;

instructing the maintenance system to execute the scheduled maintenance when the storage management system decides that the host computer system is not currently mounting the storage area;

detects, by the storage management system, a boot of the host computer system;

deciding, by the storage management system, whether the maintenance system is currently performing the maintenance for the storage area when the storage management system detects the boot of the host computer system; and enabling the host computer system to mount the storage area of the storage system when the storage management system decides that the maintenance system is not currently performing the maintenance for the storage area.

* * * * *